US008113946B2

(12) United States Patent
Walker et al.

(10) Patent No.: US 8,113,946 B2
(45) Date of Patent: Feb. 14, 2012

(54) METHOD AND APPARATUS FOR PROVIDING A TIME BASED PAYMENT FROM A GAMING DEVICE

(75) Inventors: Jay S. Walker, Ridgefield, CT (US); James A. Jorasch, Stamford, CT (US); David F. Zucker, Winnetka, IL (US); Jose A. Suarez, Fairfield, CT (US); Stephen C. Tulley, Fairfield, CT (US); Geoffrey M. Gelman, Stamford, CT (US)

(73) Assignee: IGT, Reno, NV (US)

( * ) Notice: Subject to any disclaimer, the term of this patent is extended or adjusted under 35 U.S.C. 154(b) by 970 days.

(21) Appl. No.: 10/419,303

(22) Filed: Apr. 18, 2003

(65) Prior Publication Data

US 2003/0228901 A1 Dec. 11, 2003

Related U.S. Application Data

(60) Provisional application No. 60/374,344, filed on Apr. 19, 2002, provisional application No. 60/451,607, filed on Mar. 3, 2003, provisional application No. 60/374,385, filed on Apr. 19, 2002, provisional application No. 60/374,342, filed on Apr. 19, 2002, provisional application No. 60/374,370, filed on Apr. 19, 2002, provisional application No. 60/374,625, filed on Apr. 22, 2002, provisional application No. 60/450,466, filed on Feb. 26, 2003.

(51) Int. Cl.
*A63F 9/24* (2006.01)
*A63F 13/00* (2006.01)

(52) U.S. Cl. .................. 463/25; 463/9; 463/16; 463/17; 463/18; 463/19; 463/20; 463/43; 463/26; 463/27; 463/28; 463/42

(58) Field of Classification Search .......... 463/9, 16–20, 463/25–28, 42–43
See application file for complete search history.

(56) References Cited

U.S. PATENT DOCUMENTS

| | | | | |
|---|---|---|---|---|
| 5,116,055 | A | 5/1992 | Tracy | |
| 5,178,390 | A | 1/1993 | Okada | 273/143 R |
| 5,217,224 | A * | 6/1993 | Sincock | 463/17 |
| 5,275,400 | A | 1/1994 | Weingardt et al. | 273/85 CP |
| 5,326,104 | A | 7/1994 | Pease et al. | |
| 5,560,603 | A | 10/1996 | Seelig et al. | |
| 5,564,700 | A | 10/1996 | Celona | 463/27 |

(Continued)

OTHER PUBLICATIONS

"Revealing the Casinos Best-Kept Secrets—Hot Slots & Reel Deals", Atlantic City Insider, Oct. 1996, vol. 1, No. 2.

(Continued)

*Primary Examiner* — Sunit Pandya
(74) *Attorney, Agent, or Firm* — K&L Gates LLP

(57) ABSTRACT

A method is provided for providing payments at a gaming device, where the payments may occur at predictable times and are of predictable amounts. In one or more embodiments, a gaming device may provide a guaranteed payment every hour on the hour, so long as a player meets one or more criteria. Criteria may include a total amount wagered, a total number of handle pulls completed, or a total amount of time spent at a gaming device. One or more embodiments provide a method for withholding value from a player in order that the value may delivered later in the form of a guaranteed payment. One or more embodiments provide a method whereby multiple gaming devices may provide payments simultaneously, thereby creating mutually reinforcing sounds and visual displays.

32 Claims, 14 Drawing Sheets

U.S. PATENT DOCUMENTS

| | | | | |
|---|---|---|---|---|
| 5,580,309 | A * | 12/1996 | Piechowiak et al. | 463/16 |
| 5,639,088 | A | 6/1997 | Schneider et al. | 273/138.2 |
| 5,655,961 | A * | 8/1997 | Acres et al. | 463/27 |
| 5,766,076 | A | 6/1998 | Pease et al. | |
| 5,770,533 | A | 6/1998 | Franchi | |
| 5,855,515 | A | 1/1999 | Pease et al. | |
| 5,910,048 | A | 6/1999 | Feinberg | |
| 6,012,982 | A | 1/2000 | Piechowiak et al. | 463/16 |
| 6,039,648 | A | 3/2000 | Guinn et al. | 463/16 |
| 6,089,978 | A | 7/2000 | Adams | |
| 6,102,799 | A * | 8/2000 | Stupak | 463/27 |
| 6,110,043 | A | 8/2000 | Olsen | |
| 6,146,273 | A | 11/2000 | Olsen | |
| 6,217,448 | B1 * | 4/2001 | Olsen | 463/25 |
| 6,241,608 | B1 | 6/2001 | Torango | |
| 6,270,409 | B1 * | 8/2001 | Shuster | 463/20 |
| 6,270,410 | B1 | 8/2001 | DeMar et al. | |
| 6,312,332 | B1 * | 11/2001 | Walker et al. | 463/23 |
| 6,343,989 | B1 | 2/2002 | Wood et al. | 463/23 |
| 6,435,968 | B1 | 8/2002 | Torango | |
| 6,692,353 | B2 * | 2/2004 | Walker et al. | 463/16 |
| 6,984,174 | B2 * | 1/2006 | Cannon et al. | 463/25 |
| 7,037,195 | B2 * | 5/2006 | Schneider et al. | 463/25 |
| 7,105,736 | B2 * | 9/2006 | Laakso | 84/615 |
| 2003/0064805 | A1 | 4/2003 | Wells | |
| 2003/0186739 | A1 * | 10/2003 | Paulsen et al. | 463/25 |
| 2003/0228901 | A1 * | 12/2003 | Walker et al. | 463/25 |

OTHER PUBLICATIONS

Website: "Money Time at Casino Windsor", (http //www casinowindsor com/casino/slots/moneytimehtm), download date: Jul. 25, 2001.

Fine, Adam, "Players Network Gaming Guide Article—Big River", The Casino Player, (http //www playersnetwork com/travel/articles/big-river 001,005 html), download date: Jul. 25, 2001.

Website: "CASINO CIRCLE! Presents $$$ Free $$$ Online Slot Tournaments and other Choice Online Casino Games of Chance, Luck and Skill that PAY-OFF!", (http www sidewalkshoppes com/slots__free__tournaments html), download date: Jul. 26, 2001.

Website: "Casinos featuring Slot Tournaments in Las Vegas—Slot Tournaments and how they work", (http www interexna com/tournaments html), download date: Jul. 26, 2001.

"A.C. Coin & Slot Staying Power", Global Gaming Business, Sep. 15, 2002, p. 42.

PCT International Search Report for Application No. PCT/US03/12214, 5pp.

* cited by examiner

208

| PLAYER IDENTIFIER 605 | NAME 610 | CONTACT INFORMATION 615 | PAYMENT INFORMATION 620 |
|---|---|---|---|
| P-123-45678 | JOHN SMITH | JSMITH@ AOL.COM | VISA 2222-1111-3333-4444 |
| P-234-56789 | ANN BROWN | ABROWN@ MAIL.COM; (444) 555-6666 | ACCOUNT # 666-22-1111, BIG BANK, BIG CITY, USA |
| P-345-67890 | MARY JONES | 3 MAIN ST. SMALL TOWN, USA | - |

FIG. 6

210

| GAMING DEVICE IDENTIFIER 705 | GAME 710 | BANK OF MACHINES NUMBER 715 | POSITION WITHIN BANK OF MACHINES 720 | TIME TO MAKE GUARANTEED PAYMENT 725 | SOUND EFFECTS 730 |
|---|---|---|---|---|---|
| G1111 | WILD FRUIT CRAZE | BANK #10 | POSITION #3 | EVERY HOUR ON THE HOUR | COINS DROPPING |
| G2222 | LUCKY DAYS ARE HERE AGAIN | BANK #3 | POSITION #5 | EVERY HALF HOUR, ON THE HALF HOUR | HAPPY DAYS TUNE |
| G3333 | JACKS OR BETTER POKER | BANK #3 | POSITION #6 | 10 MINUTES AND 40 MINUTES PAST EVERY HOUR | BELLS AND COINS DROPPING |
| G4444 | LUCKY DAYS ARE HERE AGAIN | BANK #3 | POSITION #7 | EVERY HALF HOUR, ON THE HOUR | HAPPY DAYS TUNE |

FIG. 7

314

| SESSION IDENTIFIER: S1122 805 | | TIME STARTED: 12:14 810 | | TAX APPLICABLE: SECOND CONSECUTIVE WIN IS A PUSH 815 | | |
|---|---|---|---|---|---|---|
| SPIN 820 | TIME OF SPIN 825 | AMOUNT WAGERED 830 | OUTCOME 835 | PAYOUT OF OUTCOME 840 | AMOUNT PAID 845 | AMOUNT WITHHELD 850 |
| 1 | 12:14:34 | $1 | BAR-LEMON-BELL | $0 | $0 | $0 |
| 2 | 12:14:40 | $1 | CHERRY-BAR-BAR | $2 | $2 | $0 |
| 3 | 12:14:46 | $1 | ORANGE-ORANGE-ORANGE | $10 | $1 | $9 |
| N | 12:47:21 | $3 | PLUM-LEMON-BAR | $0 | $0 | $0 |

FIG. 8

316

| MINUTES PAST THE HOUR 905 | PERCENTAGE OF BONUS TO BE PAID 910 |
|---|---|
| 0-10 | 100% |
| 10-15 | 75% |
| 15-30 | 50% |
| 30-50 | 25% |
| 50-60 | 100% - PAID THE FOLLOWING HOUR |

FIG. 9

318

| GUARANTEED PAYMENT AMOUNT 1005 | | NUMBER OF HANDLE PULLS MADE 1010 | | | | |
|---|---|---|---|---|---|---|
| | | 0-99 1015 | 100-199 1020 | 200-299 1025 | 300-399 1030 | 400+ 1035 |
| AVERAGE WAGER 1040 | 0-$0.99 1045 | $0 | $0 | $0 | $0 | $0 |
| | $1.00-$1.99 1050 | $0 | $5 | $10 | $20 | $25 |
| | $2.00-$3.00 1055 | $0 | $10 | $25 | $40 | $50 |

FIG. 10

METHOD AND APPARATUS FOR PROVIDING A TIME BASED PAYMENT FROM A GAMING DEVICE

RELATED APPLICATIONS

This application claims priority to commonly-owned, co-pending U.S. Provisional Patent Application Ser. No. 60/374,344, filed Apr. 19, 2002, entitled "GAMING DEVICE METHODS AND APPARATUS EMPLOYING SCHEDULED PAYOUTS" which is incorporated herein by reference in its entirety for all purposes.

This application claims priority to commonly-owned, co-pending U.S. Provisional Patent Application Ser. No. 60/451,607, filed Mar. 3, 2003, entitled "METHOD AND APPARATUS FOR PROVIDING REGULAR ENTRANCE INTO A BONUS GAME" which is incorporated herein by reference in its entirety for all purposes.

This application is related to commonly-owned, co-pending U.S. Provisional Patent Application Ser. No. 60/374,385, filed Apr. 19, 2002, entitled "GAMING DEVICE METHODS AND APPARATUS EMPLOYING FLAT RATE PLAY" which is incorporated herein by reference in its entirety for all purposes.

This application is also related to commonly-owned, co-pending U.S. Provisional Patent Application Ser. No. 60/374,342, filed Apr. 19, 2002, entitled "GAMING DEVICE METHODS AND APPARATUS EMPLOYING COMBINATION PLAY" which is incorporated herein by reference in its entirety for all purposes.

This application is also related to commonly-owned, co-pending U.S. Provisional Patent Application Ser. No. 60/374,370, filed Apr. 19, 2002, entitled "GAMING DEVICE METHODS AND APPARATUS EMPLOYING ALTERNATE PAYOUT FEATURES" which is incorporated herein by reference in its entirety for all purposes.

This application is also related to commonly-owned, co-pending U.S. Provisional Patent Application Ser. No. 60/374,625, filed Apr. 22, 2002, entitled "GAMING DEVICE METHODS AND APPARATUS EMPLOYING ALTERNATE PAYOUT FEATURES" which is incorporated herein by reference in its entirety for all purposes.

This application is also related to commonly-owned, co-pending U.S. Provisional Patent Application Ser. No. 60/450,466, filed Feb. 26, 2003, entitled "METHOD AND APPARATUS FOR REDUCING EQUITY IN A GAMING DEVICE" which is incorporated reference in its entire for all purposes.

FIELD OF THE INVENTION

The present invention relates to gaming devices. More specifically, the present invention relates to methods and apparatus for providing scheduled benefits, including scheduled payouts and scheduled entries into a bonus round.

BACKGROUND OF THE INVENTION

Slot machines generate more than $15 billion in revenue per year for US casinos. Most casinos generate more than half of their gaming revenue from slot machines. Some casinos offer three or four thousand slot machines in a single location. Many slot players believe that if they just play long enough, they will be rewarded with a significant payout. However, after a long session of play, most end up disappointed. Methods are needed for alleviating player disappointment.

BRIEF DESCRIPTION OF THE DRAWINGS

FIG. 6 is a table illustrating an example data structure of an example player database 208 as depicted in FIG. 2 for use in some embodiments of the present invention.

FIG. 7 is a table illustrating an example data structure of an example gaming device database 210 as depicted in FIG. 2 for use in some embodiments of the present invention.

FIG. 8 is a table illustrating an example data structure of an example current session database 314 as depicted in FIG. 3 for use in some embodiments of the present invention.

FIG. 9 is a table illustrating an example data structure of an example proration database 316 as depicted in FIG. 3 for use in some embodiments of the present invention.

FIG. 10 is a table illustrating an example data structure of an example guaranteed payment size database 318 as depicted in FIG. 10 for use in some embodiments of the present invention.

DETAILED DESCRIPTION OF SOME EMBODIMENTS OF THE INVENTION

Figure 1A:
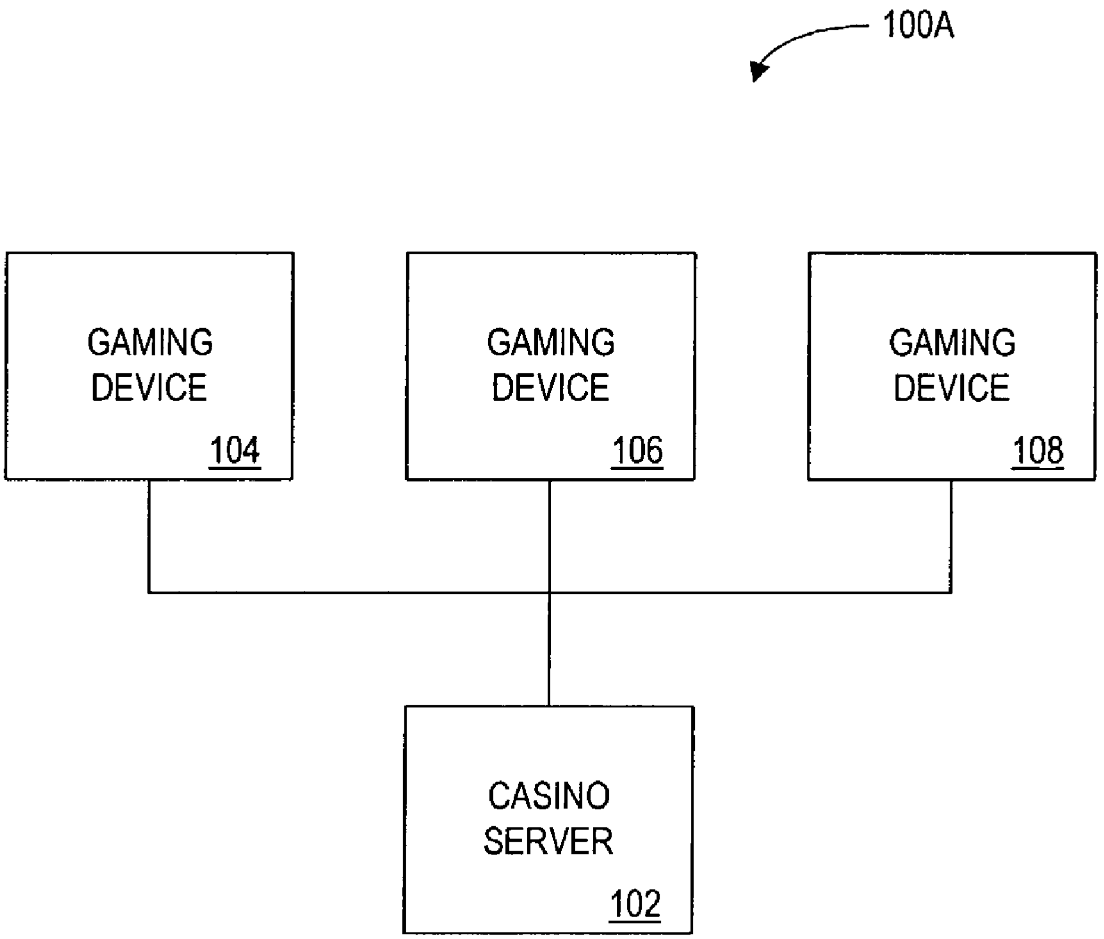
FIG. 1A is a block diagram illustrating an example system according to some embodiments of the present invention.

One or more embodiments of the present invention provide a gaming device, such as a slot machine, that pays a guaranteed payment at fixed time intervals, regardless of the outcomes a player achieves. Exemplary gaming devices might pay $50 every hour on the hour, $25 every half hour, or $10 every fifteen minutes. In one or more embodiments, a player at a gaming device is required to meet predetermined criteria before he may receive the guaranteed payment. For example, in the one-hour period prior to the payment of a guaranteed payment, a player must make at least four hundred handle pulls in order to receive the payment. Another exemplary criterion would require a player to play for at least fifty minutes in the hour-long period prior to the payment of a guaranteed payment. A significant benefit of the present invention is that a player need not rely upon good fortune in order to receive a sizable payment. Rather, if the player meets certain criteria, all of which are under his control, the player will assuredly receive a sizable payment at a predictable time (i.e., at a predictable time on the clock, or at a predictable time since commencing play). Therefore, this invention provides a large measure of control to gamblers who feel they are unlucky and unlikely to win anything.

The criteria that a player must fulfill in order to receive the payment may ensure that the gaming device can afford to pay the guaranteed payment while still maintaining profitability. For example, a gaming device might have a payment structure such that, on average, the gaming device retains 10% of a player's wagers. If a player is required to make handle pulls on a $1 denomination gaming device in order to receive the guaranteed payment, then the gaming device will have profited from the player by an average of at least $40 by the time of the guaranteed payment. The gaming device may then use the money retained from the player's play to pay the guaranteed payment. In this case, the payment might be $25, resulting in at least an average of $15 profit per player.

In some embodiments, the gaming device applies a tax to the player. The tax is used to collect money that, statistically, will be enough to fund a later guaranteed payment. In some exemplary tax embodiments, the gaming device withholds one coin from any payout of five coins or more. By the time a player has met the criteria for receiving a payment, e.g., played for fifty minutes, the amount of taxes collected may, statistically, be enough to pay a $50 payment back to the player.

Another aspect of the invention is that multiple gaming devices in a given location, such as on a casino floor, may be synchronized as to when they pay guaranteed payments. For example, there may be one hundred gaming devices on the floor of a casino, each of which pays a guaranteed payment on the hour. As each gaming device pays the payment, it may drop coins into the coin tray, flash lights, play music, and otherwise call attention to itself. When ninety-nine other such gaming devices are doing the same thing, the whole casino floor may seem to erupt in pandemonium. The commotion is likely to serve as an effective advertising mechanism for the gaming devices paying guaranteed payments, and for the casino as a whole.

In some embodiments, a bank of gaming devices may, on a periodic basis, pay a single guaranteed payment at one randomly chosen gaming device within the bank. The amount of the guaranteed payment may be dependent on the total amount of play at the bank of gaming devices within the time period prior to the payment of the guaranteed payment. Also, although the gaming device selected to receive the payment is chosen at random, the choice may be biased in favor of those gaming devices that have contributed more play or more value to a centralized fund. Alternatively, the gaming device chosen to make the payment may pay only a fraction of the payment, proportional to the amount of play at the chosen gaming device within the period prior making the payment. With this embodiment, players can win significantly larger payments, yet still feel as if the payments are within their reach, since the paying of the payment is still guaranteed.

Applicants have realized that a player at a gaming device may become frustrated when, after prolonged play, he does not obtain a significant payout. Applicants have realized that frustrated players may be likely to leave a casino, thereby depriving the casino of potential business. One or more embodiments of the present invention may alleviate the frustration of a player who feels his gaming device is unlucky. The present invention may also attract new players to gaming devices and may thereby increase business at the casino. The present invention may also encourage a player to remain for longer periods at a gaming device in anticipation of a guaranteed payment, in which case a casino may also benefit from increased player business.

A. Terms

Throughout the description that follows and unless otherwise specified, the following terms may include and/or encompass the example meanings provided in this section. These terms and illustrative example meanings are provided to clarify the language selected to describe embodiments of the invention both in the specification and in the appended claims.

The terms "player" and "user" shall be synonymous and may refer to any person or entity that operates a user device, a gaming device, a player device, and/or a user terminal.

The terms "gaming device" and "gaming machine" shall be synonymous and may refer to any electrical, mechanical, electro-mechanical, software, combination thereof, and/or other device that may accept a wager, may follow a process to generate an outcome, and may pay winnings based on the outcome. The outcome may be randomly generated, as with a slot machine; may be generated through a combination of randomness and user skill, as with video poker; or may be generated entirely through user skill. A gaming device may include any gaming machine and/or system, including slot machines, video poker machines, video bingo machines, video roulette machines, video keno machines, video blackjack machines, arcade games, video games, pinball machines, skill crane machines, video lottery terminals, online gaming systems, sports betting machines, game consoles, personal computers logged into online gaming sites, gaming device simulations, etc. Gaming devices may or may not be owned and/or maintained by a casino and/or may or may not exist within a casino location. Gaming devices may be activated by a player pressing a spin button (including bet, wager, deal, start, go, hit, and/or the like buttons), pulling a handle, and/or any other method to initiate the generation of an outcome.

The term "casino" may refer to the owner of gaming devices, owners' agents, and/or any entity who may profit from players' use of the gaming devices.

The term "casino location" may refer to the physical geographic site, complex, or building where gaming devices owned and/or operated by a casino are located. In the case of an online casino, casino location may refer to the address (e.g., the uniform resource locator (URL)) of the online casino's Web site or facility.

The terms "handle pull" and "spin" shall be synonymous and may refer to a single play at a gaming device. In some embodiments, a handle pull may refer to a single complete game (or hand) or in other embodiments, the term may refer to a play related to a single wager. For example, in video blackjack, a user might play a single game in which he splits a pair of sevens, requiring an additional wager. This single game may be considered to include one or multiple handle pulls in different embodiments.

The terms "server" and "casino server" shall be synonymous and may refer to any device that may communicate with one or more one or more gaming devices, one or more third-party servers, one or more remote controllers, one or more player devices, and/or other network nodes, and may be capable of relaying communications to and from each.

The term "user terminal" and "remote controller" shall be synonymous and may refer to any device that may communicate with one or more casino servers, one or more gaming devices, one or more third-party service provider servers, one or more player devices, and/or other network nodes. User terminals may, for example, include personal computers, laptop computers, handheld computers, telephones, kiosks, automated teller machines, gaming devices, game consoles, and/or vending machines. They may include facilities to support secure communications using encryption or the like.

The terms “player device” and “user device” shall be synonymous and may refer to any device owned or used by a user or consumer capable of accessing and/or displaying online and/or offline content. Player devices may communicate with one or more casino servers, one or more gaming devices, one or more third-party service provider servers, one or more user terminals, and/or other network nodes. In some embodiments, player devices may, for example, include gaming devices, personal computers, personal digital assistants, point-of-sale terminals, point of display terminals, kiosks, telephones, cellular phones, automated teller machines (ATMs), pagers, and combinations of such devices.

The term “input device” may refer to a device that is used to receive an input. An input device may communicate with or be part of another device such as a point of sale terminal, a point of display terminal, a user terminal, a server (e.g., a pressure sensor in a “spin” button on a gaming device), a player device, a gaming device, a controller, etc. Some examples of input devices include: a “spin” or “deal” button and/or a handle on a gaming device, a bar-code scanner, a magnetic stripe reader, a computer keyboard, a point-of-sale terminal keypad, a touch-screen, a microphone, an infrared sensor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, and a weight scale.

The term “output device” may refer to a device that is used to output information. An output device may communicate with or be part of another device (e.g., a gaming device, a point of sale terminal, a point of display terminal, a player device, a casino device, a controller, etc.). Some examples of output devices include: a cathode ray tube (CRT) monitor, liquid crystal display (LCD) screen, light emitting diode (LED) screen, a printer, an audio speaker, an infra-red transmitter, a radio transmitter.

The terms “I/O device” and “input/output device” shall be synonymous and may refer to any combination of input and/ or output devices.

The term “player tracking card” may refer to a device that may be capable of identifying and/or storing information about a consumer who is a casino player. Typically player tracking cards may be accessed by gaming devices and magnetic card readers operated by casino staff. The information stored on the player tracking card may include identifying information, as well as financial information, such as a number of gambling credits remaining. The card may be machine readable, for example, by a gaming device. According to some embodiments of the present invention, a player tracking card may store player and/or membership and/or player preference information. In some embodiments, player tracking cards merely store a pointer to information stored on a server.

The term “gross winnings” may refer to a player’s total winnings for a session or time period, without regard to the amounts wagered during the session.

The term “net winnings” may refer to a player’s total winnings for a session or time period, less the total amount wagered during that time period.

The term “parameter” may refer to a physical characteristic of a gaming device, its displayed text or graphics, its emitted sounds, or any aspect of the way in which a gaming device operates. For example, the amount of time the gaming device allows its reels to spin after a single handle pull is a parameter of the gaming device. The sensitivity of a button of the gaming device is another parameter. A third parameter is the volume at which the gaming device produces sound. A “game play” parameter may refer to a parameter related to a characteristic of a gaming device specific to the experience of playing the game of the gaming device. For example, the pace of the game may be considered a game play parameter, whereas the clock speed of the gaming device’s processor would likely not be considered a game play parameter.

The terms “session,” “gaming session,” “gambling session,” and “play session” shall be synonymous and may refer to a series of plays at one gaming device, a series of plays at multiple gaming devices, and/or a continuous period of time spent gambling in a casino.

The terms “products,” “goods,” “merchandise,” and “services” shall be synonymous and may refer to anything licensed, leased, sold, available for sale, available for lease, available for licensing, and/or offered or presented for sale, lease, or licensing including packages of products, subscriptions to products, contracts, information, services, and intangibles.

The term “merchant” may refer to an entity who may offer to sell, lease, and/or license one or more products to a consumer (for the consumer or on behalf of another) or to other merchants. For example, merchants may include sales channels, individuals, agents, companies, manufacturers, distributors, direct sellers, re-sellers, and/or retailers. Merchants may transact out of buildings including stores, outlets, malls, casinos, and warehouses, and/or they may transact via any number of additional methods including mail order catalogs, vending machines, online web sites, and/or via telephone marketing. Note that a producer or manufacturer may choose not to sell to customers directly and in such a case, a retailer may serve as the manufacturer’s or producer’s sales channel.

The terms “guaranteed payment,” “payment,” and “guaranteed payout” shall be synonymous and may refer to a payment provided by a gaming device that is independent of the particular outcomes achieved by the gaming device. A guaranteed payment may typically be paid according to a predetermined schedule, and may be paid to any player who meets predetermined criteria for receiving the payment during the period prior to paying the scheduled payment. The payment may be in the form of cash, credits, tokens, or other consideration.

The term “scheduled payment” may refer to a guaranteed payment that is to occur at a particular time, or on a recurring basis at a predictable time (e.g., every hour on the hour).

The terms “outcome-dependent payout” and “conventional payout” shall be synonymous and may refer to payments provided by a gaming device that are of random sizes and/or that occur at random times due to the random nature of outcomes upon which the are based. For example the outcome “BAR-BAR-BAR” may be associated with the “outcome dependent payout” of $10, wherein the outcome dependent payout is made only during the random times when the outcome “BAR-BAR-BAR” is generated. An outcome dependent payout may thus be contrasted with a guaranteed payment, which may be of a predictable size and which may occur at a predictable time.

The term “synchrony” may refer to the state of multiple gaming devices when all provide guaranteed payments at the same time, or on the same schedule.

The term “tax,” when used as a noun, may refer to a rule or set of rules for collecting money from a player and/or for withholding money from a player at a gaming device. According to one exemplary tax, a gaming device retains one coin of any payout won by the player when the payout is four coins or more.

The term "tax," when used as a verb may refer to the act of applying the rules of a tax, i.e. to collect money from a player, or withhold money from a player at a gaming device.

B. System

Figure 2:
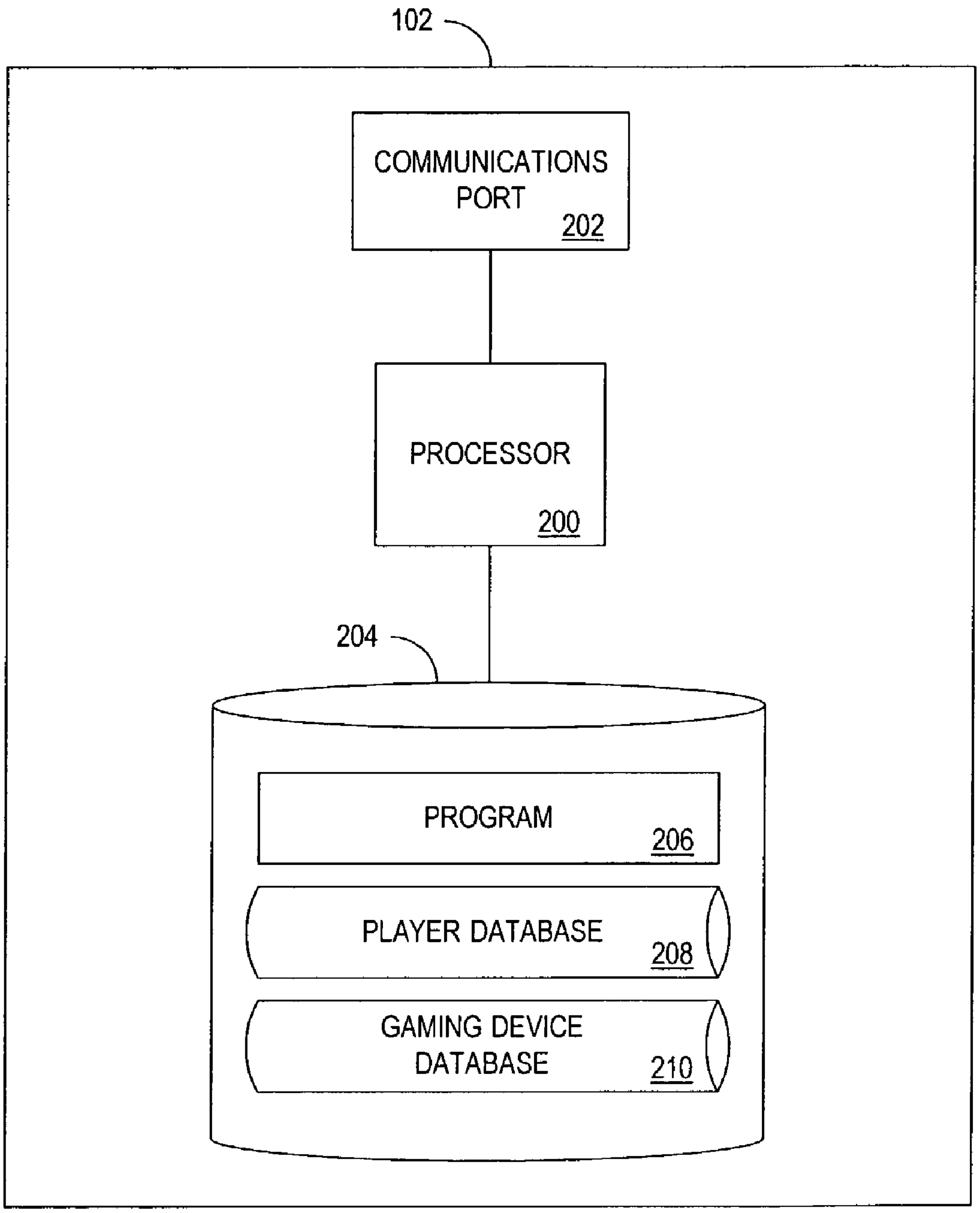
FIG. 2 is a block diagram illustrating an example of the details of a casino server 102 as depicted in FIG. 1 according to some embodiments of the present invention.
Figure 3:
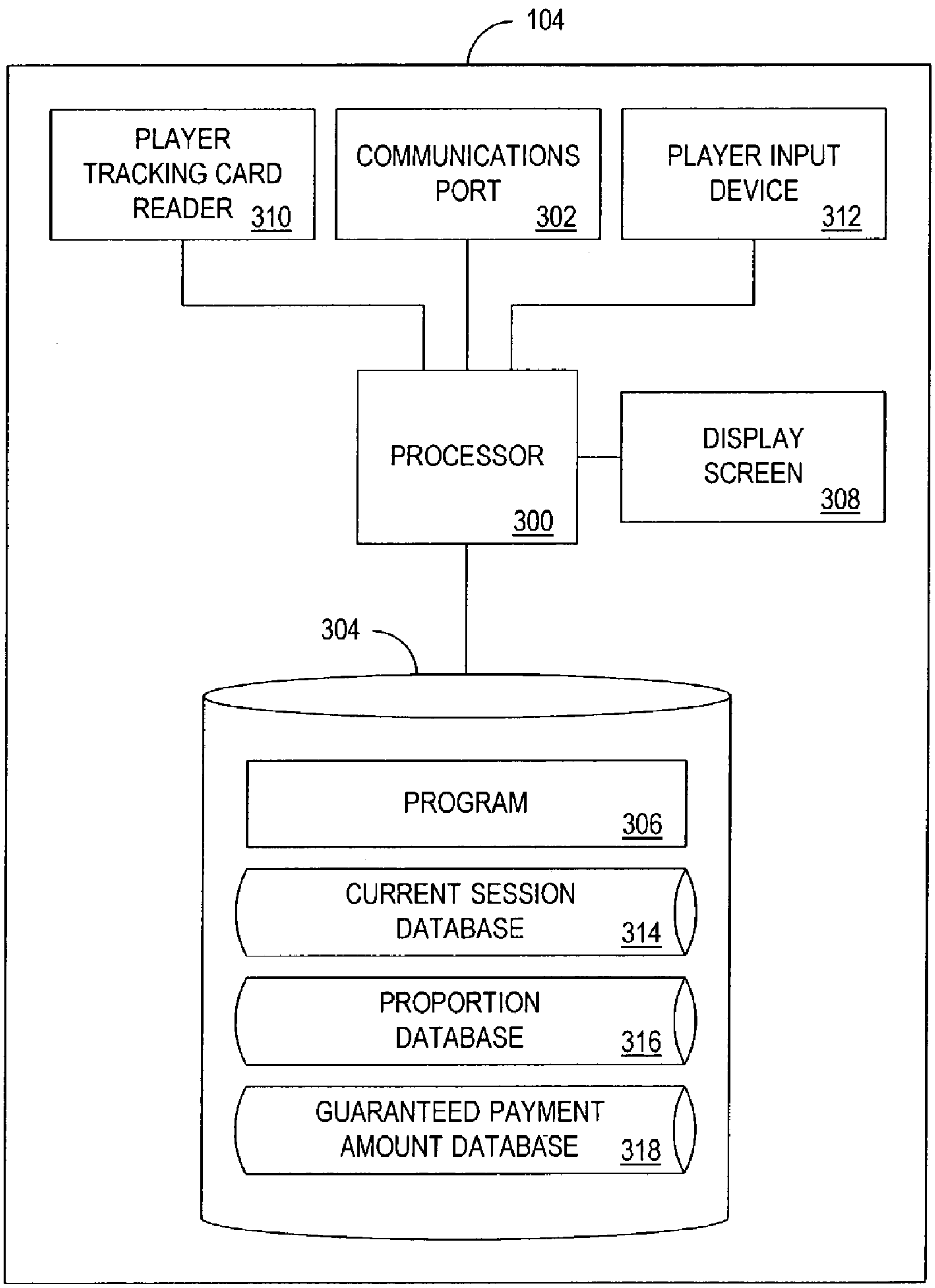
FIG. 3 is a block diagram illustrating an example of the details of a gaming device 104 as depicted in FIG. 1 according to some embodiments of the present invention.

An example embodiment of the system 100A of the present invention is depicted in FIG. 1A. The system 100A according to some embodiments of the present invention may include a casino server 102 (an example of which is depicted in FIG. 2) in one or two-way communication with one or more gaming devices 104, 106, 108 (an example of which is depicted in FIG. 3) via a network such as, for example, the Internet or via another communications link. Although not pictured, other casino devices besides gaming devices 104, 106, 108 may be connected to the casino server 102. Likewise, servers of other casinos and other establishments may be in direct or indirect communication with the casino server 102.

In operation, the casino server 102 may function under the control of a casino, a merchant, or other entity that may also control use of the gaming devices 104, 106, 108. For example, the casino server 102 may be a server in a merchant's network. In some embodiments, the casino server 102 may also be a merchant's server.

Figure 1B:
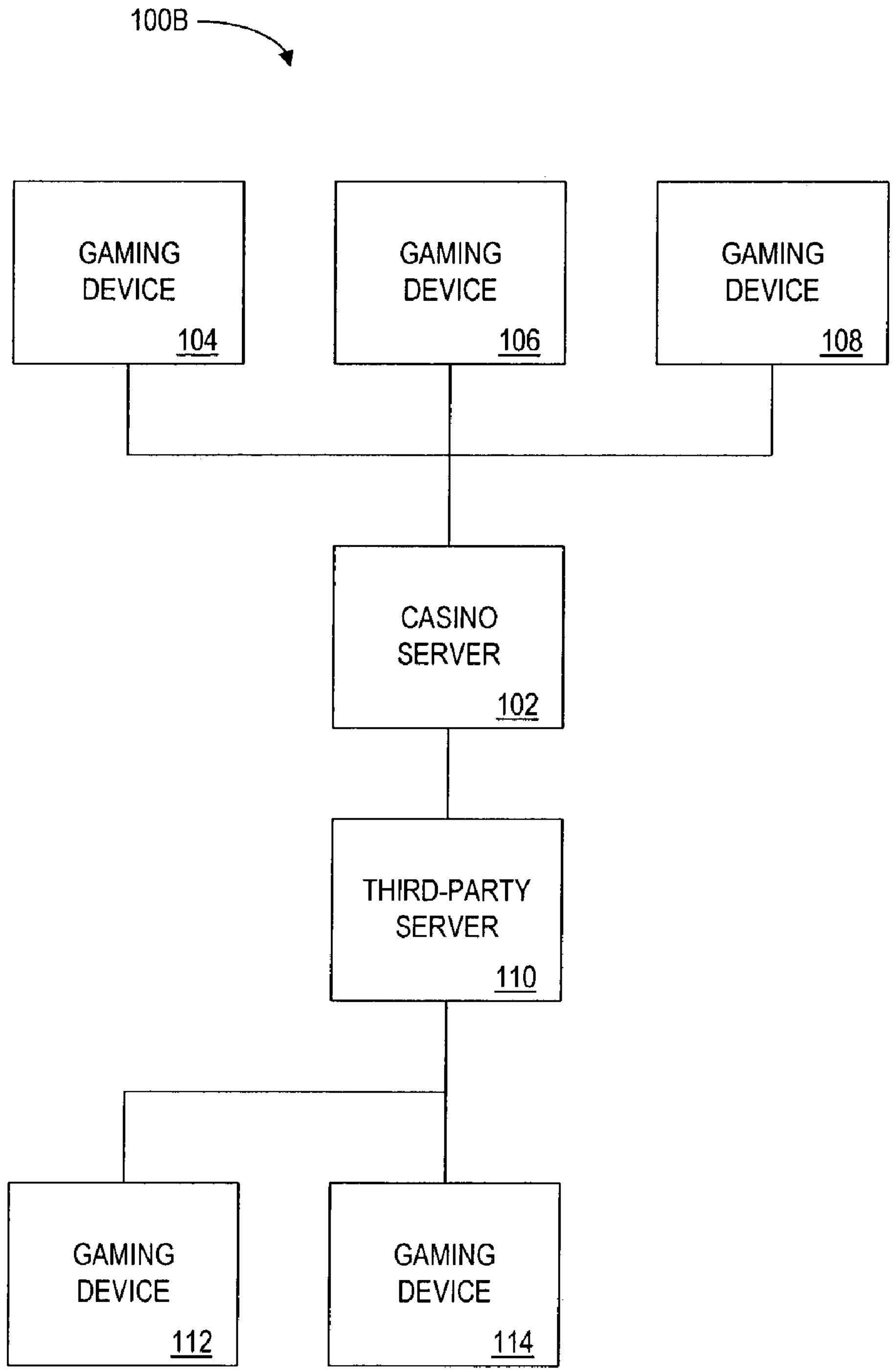
FIG. 1B is a block diagram illustrating an alternative example system according to some embodiments of the present invention.

Referring to FIG. 1B, an alternative system 100B according to some other embodiments of the present invention further includes one or more third-party servers 110. A third-party server 110 may also be in one or two-way communication with the casino server 102. However, as shown in the embodiment depicted in FIG. 1B, the third-party server 110 may be disposed between the casino server 102 and gaming devices 112, 114. Alternatively (not pictured), the third-party server 110 may be disposed between the casino server 102 and casino servers of other casinos.

The primary difference between the two alternative embodiments depicted in FIGS. 1A and 1B is that the embodiment of FIG. 1B includes the third-party server 110 which may be operable by an entity distinct and/or physically remote from the entity operating the casino server 102. In operation, the third-party server 110 may perform the methods of the present invention by sending signals to the casino server 102 to be relayed to the gaming devices 104, 106, 108. For example, a marketing company may operate the third-party server 110 to direct gaming devices 104, 106, 108, 112, and 114 to provide synchronized payments, all at a particular time that is significant for the marketing company (e.g., at a time that represents the opening time of a business being promoted by the marketing company. In the embodiment of FIG. 1A, the functions of the third-party server 110 may be consolidated into the casino server 102.

An additional difference between these two embodiments relates to the physical topology of the systems 100A and 100B. In both of the depicted embodiments, each node may securely communicate with every other node in the system 100A, 100B via, for example, a virtual private network (VPN). Thus, all nodes may be logically connected. However, the embodiment depicted in FIG. 1B allows the third-party server 110 to optionally serve as a single gateway between the nodes 102, 104, 106, 108 that will typically be under the control of a casino (and players within the casinos' location) and the other nodes in the system 100B, i.e., nodes 112, 114 that may be operated by players outside of the casinos' location. In some embodiments of the present invention, the centralization, security, and control that naturally results from this topology is useful in operating, maintaining, and monitoring use of the system 100B.

In both embodiments pictured in FIGS. 1A and 1B, communication between the casino server 102, the gaming devices 104, 106, 108, (112, 114), and/or the third-party server 110, may be direct and/or via a network such as the Internet.

Referring to both FIGS. 1A and 1B, each of the casino server 102, (the third-party server 110 of FIG. 1B), and the gaming devices 104, 106, 108, (112, 114) may comprise, for example, computers, such as those based on the Intel® Pentium® processor, that are adapted to communicate with each other. Any number of third-party servers 110, external casino servers (not pictured), and/or gaming devices 104, 106, 108, (112, 114) may be in direct or indirect, one or two-way communication with the casino server 102. The third-party server 110, the casino server 102, and/or the gaming devices 104, 106, 108, (112, 114) may each be physically proximate to each other or geographically remote from each other. The third-party server 110, the casino server 102, and/or the gaming devices 104, 106, 108, (112, 114) may each include input devices and output devices.

As indicated above, communication between the casino server 102, the third-party server 110, and the gaming devices 104, 106, 108, (112, 114) may be direct or indirect, such as over an Internet Protocol (IP) network such as the Internet, an intranet, or an extranet through a web site maintained by the casino server 102 (and/or the third-party server 110) on a remote server or over an online data network including commercial on-line service providers, bulletin board systems, routers, gateways, and the like. In some embodiments, the nodes may communicate with each other over local area networks including Ethernet, Token Ring, FDDI Full Duplex Technology (FFDT), and the like, radio frequency communications, infrared communications, microwave communications, cable television systems, satellite links, Wide Area Networks (WAN), Asynchronous Transfer Mode (ATM) networks, Public Switched Telephone Network (PSTN), other wireless networks, and the like.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks or months at a time.

The casino server 102 (and/or the third-party server 110) may function as a "Web server" that presents and/or generates Web pages which are documents stored on Internet-connected computers accessible via the World Wide Web using protocols such as, e.g., the hyper-text transfer protocol ("HTTP"). Such documents typically include one or more hyper-text markup language ("HTML") files, associated graphics, and script files. A Web server allows communication with the casino server 102 in a manner known in the art. The gaming devices 104, 106, 108, (112, 114) may use a web browser, such as NAVIGATOR® published by NETSCAPE® for accessing HTML forms generated or maintained by or on behalf of the casino server 102 and/or the third-party server 110.

As indicated above, any or all of the casino server 102, the third-party server 110, and/or the gaming devices 104, 106, 108, (112, 114) may include or be part of, e.g., processor based cash registers, telephones, interactive voice response (IVR) systems such as the ML400-IVR designed by MISSING LINK INTERACTIVE VOICE RESPONSE SYSTEMS, cellular/wireless phones, vending machines, pagers, gaming devices including slot machines, personal computers, portable types of computers, such as a laptop computer, a wearable computer, a palm-top computer, a hand-held computer, a smart card, and/or a Personal Digital Assistant ("PDA"). Further details of the casino server 102, the third-party server 110, and the gaming devices 104, 106, 108, (112, 114) are provided below with respect to FIGS. 2 through 5.

As indicated above, in some embodiments of the invention, the casino server 102 (and/or the third-party server 110) may include gaming devices 104, 106, 108, (112, 114). In addition, the casino server 102 may communicate with users directly instead of through the gaming devices 104, 106, 108, (112, 114). Although not pictured, the casino server 102, the third-party server 110, and/or the gaming devices 104, 106, 108, (112, 114) may also be in communication with one or more consumer and/or merchant credit institutions to effect currency transactions and may do so directly or via a secure financial network such as the Fedwire network maintained by the United States Federal Reserve System, the Automated Clearing House (ACH) Network, the Clearing House Interbank Payments System (CHIPS), or the like.

In operation, the gaming devices 104, 106, 108, (112, 114) and/or the third-party server 110 may exchange information about times during which two or more gaming devices will provide guaranteed payments, the sound effects that will be produced by two or more gaming devices when providing guaranteed payments, about the visual effects that will be produced by two or more gaming devices, and so on. In embodiments with a third-party server 110, the casino server 102 and/or the gaming devices 104, 106, 108, (112, 114) may exchange information about the times, sound effects, and/or the visual effects, etc., via the third-party server 110. The gaming devices 104, 106, 108, (112, 114) may for example, provide information related to a particular time at which the respective gaming devices will provide a guaranteed payment.

C. Devises

FIG. 2 is a block diagram illustrating details of an example of the casino server 102 of FIGS. 1A and 1B (and/or an example of a third-party server 110 of FIG. 1B). The casino server 102 is operative to manage the system 100A, 100B and execute the methods of the present invention. The casino server 102 may be implemented as one or more system controllers, one or more dedicated hardware circuits, one or more appropriately programmed general purpose computers, or any other similar electronic, mechanical, electro-mechanical, and/or human operated device. For example, in FIG. 1B, the casino server 102 is depicted as being in communication with a third-party server 110. In the embodiment of FIG. 1B, these two servers may provide the same functions as the casino server 102 alone in the embodiment of FIG. 1A.

The casino server 102 (and/or the third-party server 110) may include a processor 200, such as one or more Intel® Pentium® processors. The processor 200 may include or be coupled to one or more clocks or timers (not pictured) and one or more communication ports 202 through which the processor 200 communicates with other devices such as the gaming devices 104, 106, 108, (112, 114) and/or the third-party server 110. The processor 200 is also in communication with a data storage device 204. The data storage device 204 may include any appropriate combination of magnetic, optical and/or semiconductor memory, and may include, for example, additional processors, communication ports, Random Access Memory ("RAM"), Read-Only Memory ("ROM"), a compact disc and/or a hard disk. The processor 200 and the storage device 204 may each be, for example: (i) located entirely within a single computer or other computing device; or (ii) connected to each other by a remote communication medium, such as a serial port cable, a LAN, a telephone line, radio frequency transceiver, a fiber optic connection or the like. In some embodiments for example, the casino server 102 may comprise one or more computers (or processors 200) that are connected to a remote server computer operative to maintain databases, where the data storage device 204 is comprised of the combination of the remote server computer and the associated databases.

The data storage device 204 stores a program 206 for controlling the processor 200. The processor 200 performs instructions of the program 206, and thereby operates in accordance with the present invention, and particularly in accordance with the methods described in detail herein. The present invention may be embodied as a computer program 206 developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. The program 206 may be stored in a compressed, uncompiled and/or encrypted format. The program 206 furthermore may include program elements that may be generally useful, such as an operating system, a database management system and device drivers for allowing the processor 200 to interface with computer peripheral devices. Appropriate general purpose program elements are known to those skilled in the art, and need not be described in detail herein.

Further, the program 206 is operative to execute a number of invention-specific, objects, modules and/or subroutines which may include (but are not limited to) one or more routines to identify a player at a gaming device 104, 106, 108, (112, 114); one or more routines to receive information about a user; one or more routines to establish a synchronized group of gaming device 104, 106, 108, (112, 114); one or more routines to form and register a group and associate players with the group; one or more routines to facilitate and control communications between gaming devices 104, 106, 108, (112, 114) and/or a third-party server 110; one or more routines to make hourly payments or synchronized payments, and/or one or more routines to control databases or software objects that track information regarding users, casinos, merchants supplying prizes, other third-parties, gambling results, group data, gaming devices 104, 106, 108, (112, 114), and awarding prizes. Examples of these routines and their operation are described in detail below in conjunction with the flowchart depicted in FIGS. 11 through 13.

According to some embodiments of the present invention, the instructions of the program 206 may be read into a main memory of the processor 200 from another computer-readable medium, such from a ROM to a RAM. Execution of sequences of the instructions in the program 206 causes processor 200 to perform the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software.

In addition to the program 206, the storage device 204 is also operative to store (i) a player database 208, and (ii) gaming device database 210. The databases 208 and 210 are described in detail below and example structures are depicted with sample entries in the accompanying FIG.s. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though in total five separate databases are illustrated (including two on the casino server 102 and three on a gaming device 104), the invention could be practiced effectively using one, two, three, four, six, or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention. These processes are described below in detail with respect to FIGS. 11 through 13.

Turning to FIG. 3, a block diagram depicting an example of a gaming device 104 may include a processor 300 coupled to a communications port 302, a data storage device 304 that stores a gaming device program 306, a display screen 308, a player tracking card reader 310, and/or a player input device 312. In addition to the gaming device program 306, the storage device 304 is also operative to store (i) a current session database 314, (ii) a proration database 316, and (iii) a guaranteed payment size database 318. In embodiments in which, for example, the casino server 102 serves/controls multiple casinos operated by different entities, a casino may wish to have a local copy of the portions of the casino server's databases 208, 210 that include entries related to that casino on the gaming device 104 and exclude other casinos' access to that casino's information. Thus, in some embodiments of a gaming device 104 according to the present invention there may be included local copies of some portions of the databases 208, 210. Such a redundant configuration may provide enhanced system performance by reducing network communications.

A gaming device program 306 may include one or more routines to respond to requests from other gaming devices 106, 108, (112, 114) for group data and performance information. In other words, a local copy of a portion of the user database (not pictured) may provide the gaming device program 306 with access to information about specific players. Such a distributed configuration may provide enhanced system security by allowing different casinos to store and maintain their own databases. In some embodiments, local copies of the databases are not stored on the gaming devices 104, 106, 108, (112, 114) and instead, the gaming device program 306 accesses the player database 208 and the gaming device database 210 stored and maintained on the casino server 102. Likewise, in some embodiments, the databases may only exist on a third-party server 110 and thus, both the casino server 102 and the gaming devices 104, 106, 108, (112, 114) access the third-party server 110 for the data.

Figure 4:
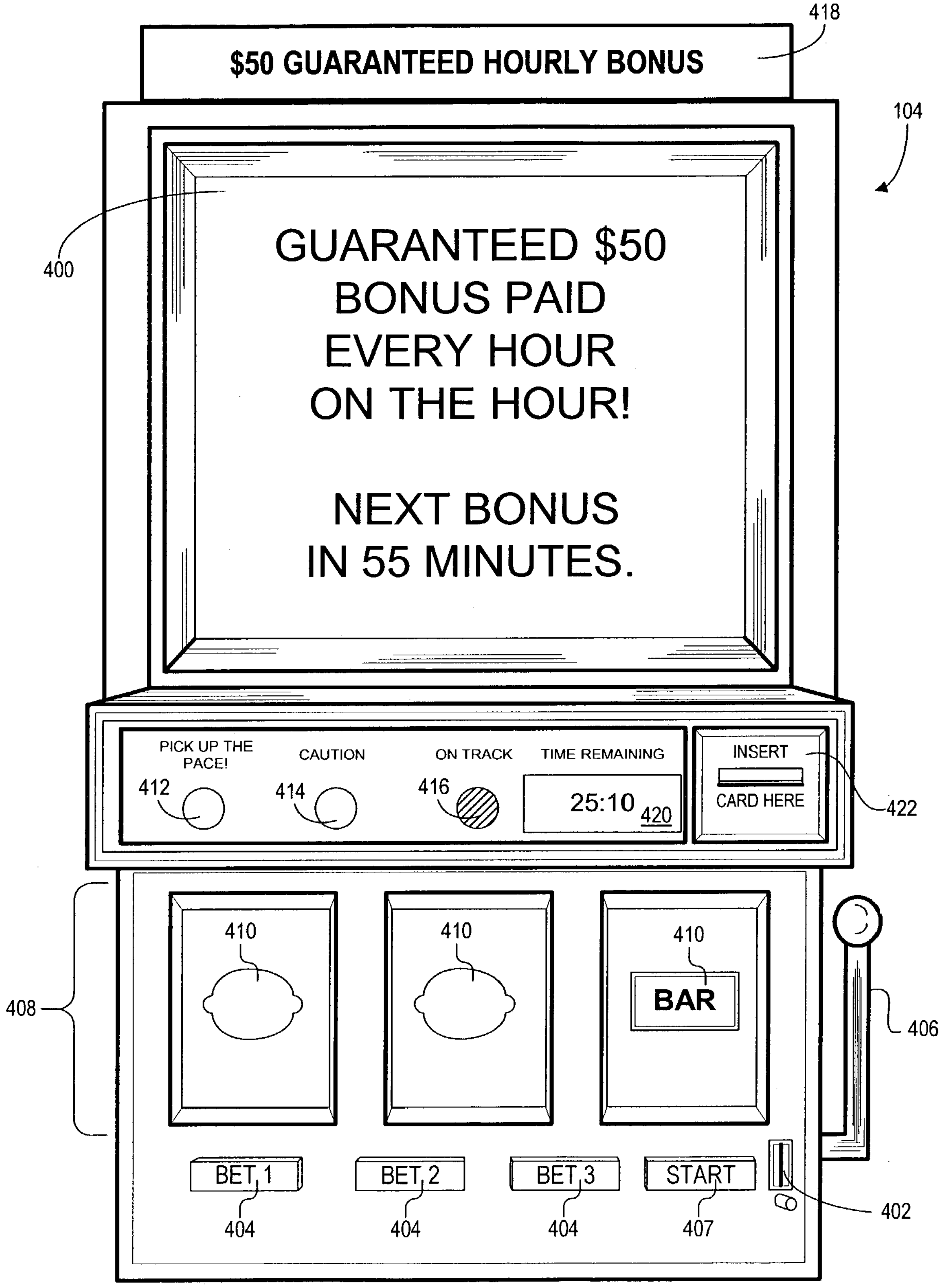
FIG. 4 is a diagram illustrating an example of the external appearance of a gaming device 104 as depicted in FIG. 1 according to some embodiments of the present invention.
Figure 5:
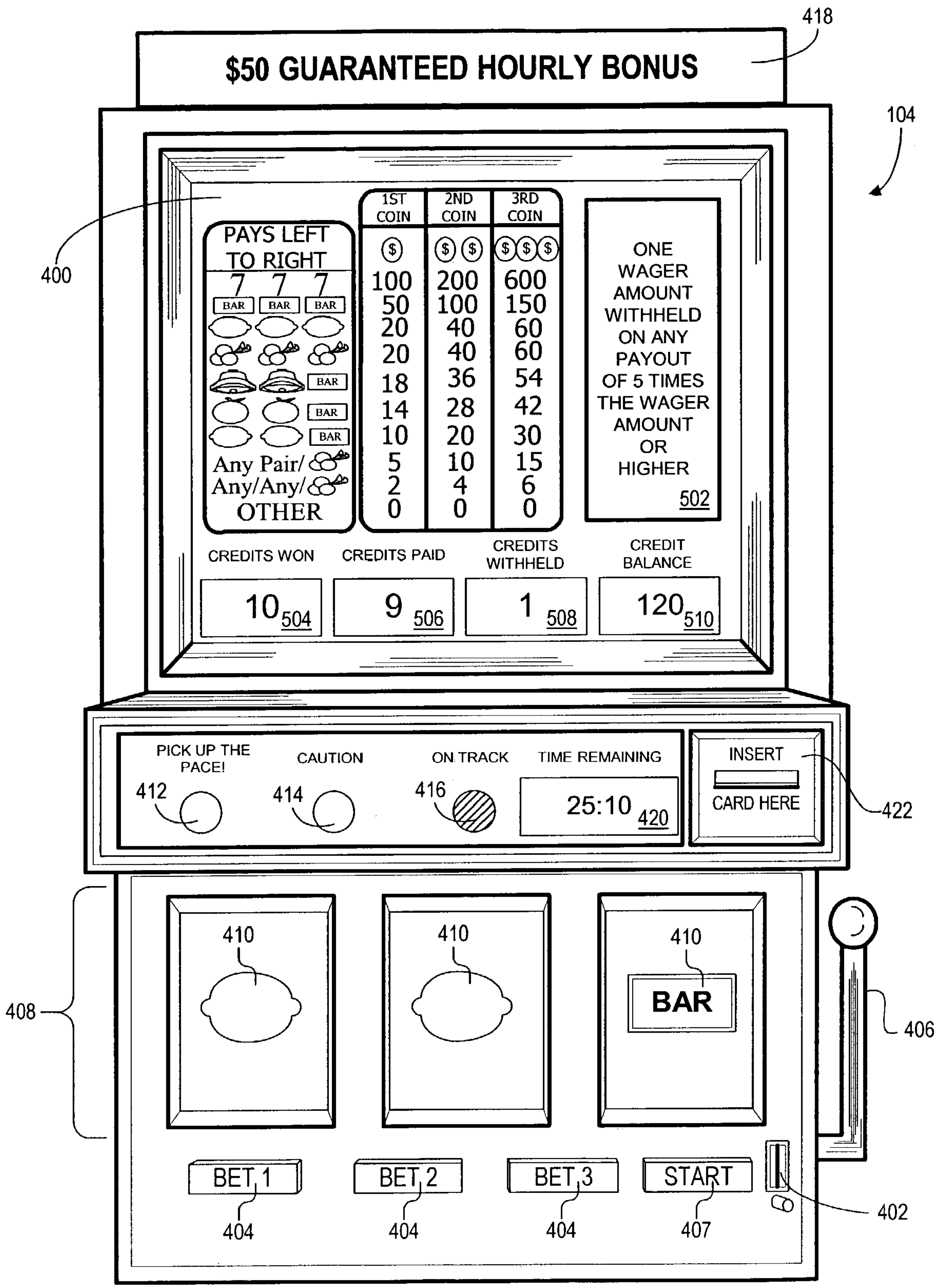
FIG. 5 is a diagram illustrating an example of the external appearance of a gaming device 104 as depicted in FIG. 1 according to some other embodiments of the present invention.

Turning to FIGS. 4 and 5, illustrations of an example of the exterior of a gaming device 104 according to some embodiments of the present invention are depicted. In some embodiments, the player input device 314 may include a coin slot 402, "bet" buttons 404, handle 406, spin button 407, and a player tracking card reader 422. Coin slot 402 may function receive currency with which a player may place wagers. "Bet" buttons 404, including a "bet 1" button, a "bet 2" button, and a "bet 3" button, may allow a player to vary the size of his wager for a given game from one coin to three coins by pressing the appropriate button. Handle 406 may allow a player, by pulling said handle, to initiate the spinning of reels 408. The spin button 407 may also allow a player to initiate the spinning of the reels. The player tracking card reader may 422 may be operable to receive a tracking card from the player and to thereby identify a player, and to transmit information about the player to for example, the casino server 102 where player information may be tracked. Reels 408 may be physical or mechanical, and may display symbols such as those indicated at 410. Display screen 400 may display various messages to a player. In FIG. 5, display screen 400 indicates a pay table and a credit balance, among other things. Sign 418 advertises a feature of gaming device 104, namely, that gaming device 104 provides a "50 Guaranteed Hourly Bonus." Other features illustrated in FIGS. 4 and 5 will be described further herein.

D. Databases

As indicated above, it should be noted that although the example embodiment depicted in FIGS. 2 and 3 include five particular databases stored in storage devices 204 and 304, other database arrangements may be used which would still be in keeping with the spirit and scope of the present invention. In other words, the present invention could be implemented using any number of different database files or data structures, as opposed to the five depicted in FIGS. 2 and 3. Further, the individual database files could be stored on different devices (e.g., located on different storage devices in different geographic locations, such as on a server). Likewise, the programs 206, 306 could also be located remotely from the storage devices 204, 304 and/or on another server. As indicated above, the programs 206, 306 may include instructions for retrieving, manipulating, and storing data in the databases 208, 210, 308, 310, 312, as may be useful in performing the methods of the invention as will be further described below.

Turning to FIG. 6, a tabular representation of an embodiment of a player database 208 according to some embodiments of the present invention is illustrated. This particular tabular representation of a player database 208 includes three sample records or entries, each of which pertains to a different player. Example database 208 contains four fields for each record. The four fields are labeled with reference numerals 605, 610, 615, and 620. Each field corresponds to a different piece of information about a player.

In one or more embodiments, a casino may employ a player database 208 such as that of FIG. 6 in order to keep track of information about customers of the casino. Such information may be valuable for various interactions with players. In database 208, each player is tracked using a player identifier 605. The next field in database 208 is for the player's name 610. Storing a player's name allows the casino to personalize any contact it has with the player, and to make the player feel as if the casino is providing him with individual attention. Field 615 of database 208 stores player contact information. Player contact information may be valuable if the casino wishes to contact a player about upcoming events or promotions at the casino. Field 620 of database 208 stores payment information for each record or entry. Payment information may be valuable in receiving payments from a player. For example, a casino may allow a player to quickly reserve a hotel room at the casino without the hassle of writing a check, or of swiping a credit card. The casino may simply charge the financial account on file for the player under for example, the payment information 620 field of the player database 208.

The example player database 208 depicted in FIG. 6 provides example data to illustrate the meaning of the information stored in this database embodiment. Three example entries are provided. In the first example entry, the player is identified by player identifier "P-123-45678". The player's name is "John Smith". Contact information for John Smith includes an email address, "jsmith@aol.com". Payment information for John Smith includes a "Visa" account, with account number "2222-1111-3333-4444". In the second exemplary entry, player "P-234-56789" is named "Ann Brown". Ann Brown's contact information includes email address "abrown@mail.com" and phone number "(444) 555-6666". Ann Brown's payment information includes the account number "666-22-1111" for her bank account at "Big Bank" in "Big City, USA". In the third exemplary entry, the player identified by "P-345-67890" is named Mary Jones. Contact information for Mary Jones includes an address at "3 Main St.; Small Town, USA". There is no entry under the payment information field 620 for Mary Jones, indicating that there is no payment information on file for Mary Jones.

Referring now to FIG. 7, the gaming device database 210 of FIG. 2 is described in greater detail. FIG. 7 contains information about various gaming devices contained within a casino. However, it should be noted that in one or more embodiments, the gaming devices described in database 210 of FIG. 7 need not all reside in one casino. Database 210 includes four exemplary records or entries, each corresponding to a single gaming device. Database 210 also includes six fields indicated by reference numerals 705, 710, 715, 720, 725, and 730. Each field reveals a different type of information about corresponding gaming devices. The information contained within database 210 may be important for practicing one or more embodiments of the invention. For instance, casino server 102 may, in accordance with some embodiments, synchronize the times at which two or more gaming devices 104, 106, 108 provide a payment. Accordingly, database 210 may store times at which one or more gaming devices are to provide payments. The casino server 102 may ensure that scheduled times match for two gaming devices 104, 106 that are to make payments at the same time. Various embodiments will be described in greater detail below.

The example player database 210 depicted in FIG. 7 provides example data to illustrate the meaning of the information stored in this database embodiment. Four example entries are provided. Field 705 contains an identifier for each respective gaming device. Field 710 stores a name of the game featured on each respective gaming device. Field 715 stores the number of the bank of machines on which each respective gaming device is located. For example, a casino may contain a plurality of banks of machines. Each bank may be a single cluster of gaming devices, with anywhere from, for example, 2 to 20 gaming devices within the bank. Each bank may contain gaming devices of similar theme, of similar coin denomination, of similar exterior design, and so on. However, there need not necessarily be similarity between gaming devices within a bank of machines. Each bank of machines may have a corresponding number for reference purposes. Such a number may be used on charts describing the layout of the casino floor. Thus, for example, a bank number may server as a convenient way for locating a gaming device on the casino floor. Furthermore, gaming devices with like bank numbers may be assumed to lie within the same bank of gaming devices, and may thereby be assumed to lie within proximity to one another. The relative proximity of two or more gaming devices may be relevant to one or more embodiments of the present invention. Field 720 of database 210 stores a position within a bank of machines for each respective gaming device. A position number may likewise serve as a convenient way for discerning the location of a gaming device within a bank of machines. For instance, a first gaming device may be said to occupy position 1, a second gaming device to occupy position 2, and so on. Presumably, gaming devices 104, 106, 108 associated with consecutive position numbers are adjacent or at least proximate to one another on a casino floor.

Field 725 of database 210 contains a time to make a guaranteed payment for each respective gaming device. As will be apparent, field 725 for any given record need not contain only a single time. For example, field 725 for the record corresponding to the gaming device "G1111" contains "every hour on the hour". Thus, gaming device "G1111" is scheduled to make a guaranteed payment every hour on the hour. Field 730 of database 210 stores sound effects to be produced by each respective gaming device. Each gaming device may, for example, produce sound effects at a time when it is scheduled to make a guaranteed payment.

Referring now to the first example record of database 210, gaming device "G1111" allows a player to play the "Wild Fruit Craze" game. Gaming device "G1111" is located in "bank #10" at "position #3". "G1111" is scheduled to make a guaranteed payment "every hour on the hour" and to produce sound effects of "coins dropping." Gaming device "G2222" allows a player to play the "Lucky Days are Here Again" game. It is located on "bank #3" at "position #5." "G2222" is scheduled to make a guaranteed payment "every half hour, on the half hour" and to play the "Happy Days Tune" as sound effects. Gaming device "G3333" allows a player to play the "Jacks or Better Poker" game. It is located on "bank #3" at "position #6." "G3333" is scheduled to make a guaranteed payment "10 minutes and 40 minutes past every hour" and to produce sound effects of "bells and coins dropping." Gaming device "G4444" allows a player to play the "Lucky Days are Here Again" game. It is located on "bank #3" at "position #7." "G4444" is scheduled to make a guaranteed payment "every half hour, on the half hour" and to play the "Happy Days Tune" as sound effects. Note that gaming devices G2222, G3333, and G4444 are all located in the same bank of machines, and all occupy adjacent positions.

Referring now to FIG. 8, the current session database 314 of FIG. 3 is described in greater detail. FIG. 8 contains information about an exemplary player session at a gaming device. Information about a player session may be useful in one or more embodiments of the present invention. For instance, one or more embodiments require that a player make a certain number of handle pulls within the hour prior to a scheduled payment in order for the player to be eligible to receive the payment. Thus, by tracking the handle pulls made by a player in database 314, a gaming device may determine whether the player is eligible to receive a guaranteed payment.

The example current session database 314 depicted in FIG. 8 provides example data to illustrate the meaning of the information stored in this database embodiment. Four example entries are provided. Each entry corresponds to a single pull at a gaming device. In addition, ten fields are provided. Three of the fields, fields 805, 810, and 815, are summary fields for the database. Seven of the fields, fields 820, 825, 830, 835, 840, 845, and 850, are fields that store information corresponding to each respective record or entry. Field 805 stores a session identifier. The session identifier may provide a single identifier by which the gaming device or casino server may categorize and refer to the activities performed within a playing session. A session may include, for example, the time interval during which a player engages in play at a gaming device on a reasonably consistent basis (e.g., with gaps between handle pulls of no more than 2 minutes). Activities performed during a playing session may include making one or more handle pulls, inserting or withdrawing a player tracking card, inserting or withdrawing currency, and so on. The database 314 tracks various activities associated with individual handle pulls. Such activities will be described further herein with reference to the other fields of database 314. The exemplary session identifier illustrated in database 314 is "S122".

Field 810 stores a time at which a session began. Such a time may correspond, for example, to a time when a player made his first handle pull at a gaming device (at least within the last e.g., 2 minutes). The exemplary time started illustrated in database 314 is "12:14". Field 815 stores a tax applicable to the particular session. Taxes are described more fully below. However, it may be noted that taxes govern a mechanism for collecting value from a player. The value collected in taxes may later be returned to the player in the form of a guaranteed payment. In particular, the tax applicable described in field 815 may govern the amount to be collected from a player on any given handle pull, an amount which may be stored under field 850, to be described shortly. The exemplary tax applicable illustrated in database 314 is "second consecutive win is a push." Such a tax may indicate that, if a player wins a second payout on the handle pull after having won a first payout, then the second handle pull is treated as a push. With a push, the player has his wager returned, but does not receive the full amount of the payout if the amount of the payout exceeds the amount of the wager. Thus, the exemplary tax collects value from a player by collecting money from payouts that follow a winning payout.

Field 820 of database 314 contains a spin identifier. The spin identifier assigns a label, for tracking purposes, to each handle pull, or "spin", made by a player during the session described in field 805. Field 825 stores a time at which a spin is made for each respective spin. Field 830 stores an amount wagered for each respective spin. Field 835 stores an outcome for each respective spin. Field 840 stores a payout corresponding to each respective outcome described in field 835. Field 845 stores an amount paid of each respective payout described in field 840. Note that the full amount of a payout described in field 840 need not be paid to a player. In particular, a full amount of a payout need not be paid if a portion of the payout is withheld as taxes. Field 850 stores an amount withheld of a respective payout described in field 840. The amount withheld may be governed by the tax applicable stored in field 815. In general, for a particular record, the sum of the amounts stored in fields 845 and 850 is equal to the amount stored in field 840. This is because the payout of an outcome 840 may be divided into an amount paid to a player 845, and an amount withheld 850.

Referring now to the first example record of database 314, spin "1" was made at time "12:14:34." The amount wagered for spin "1" was "$1." The outcome of spin "1" was "bar-lemon-bell." The payout for the outcome "bar-lemon-bell" was "$0." The amount paid of the payout was "$0." The amount withheld from the payout was "$0." The amount wagered for spin "2" was "$1." The outcome of spin "2" was "cherry-bar-bar." The payout for the outcome "cherry-bar-bar" was "$2." The amount paid of the payout was "$2." The amount withheld from the payout was "$0." The amount wagered for spin "3" was "$1." The outcome of spin "3" was "orange-orange-orange." The payout for the outcome "orange-orange-orange" was "$10." The amount paid of the payout was "$1." The amount withheld from the payout was "$9." Note that spin "3" is the only illustrated spin for which the tax applicable results in a positive amount being withheld. Since spin "2" was a winning spin (since there was a payout of $2), and since spin "3" was a winning spin (since there was a payout of $10), the "second consecutive win is a push" tax applies. Therefore, rather than receiving the full payout, the player only receives his wager of $1 back. Correspondingly, $9 is withheld in taxes. The amount wagered for spin "N" was "$3". The outcome of spin "N" was "plum-lemon-bar". The payout for the outcome "plum-lemon-bar" was "$0". The amount paid of the payout was "$0". The amount withheld from the payout was "$0".

Referring now to FIG. 9, the proration database 316 of FIG. 3 is described in greater detail. FIG. 9 illustrates an exemplary relationship describing the percentage of a guaranteed payment to be provided to a player as a function of the time at which a player began play at a gaming device 104. One or more embodiments of the present invention provide a guaranteed payment to a player who has played at a gaming device 104 for a predetermined amount of time prior to the time of a scheduled payment. For example, a player who has played for the entire hour preceding the time of a guaranteed payment may be eligible to receive the guaranteed payment at the time when it is scheduled to be provided. However, one or more embodiments may also allow a player who has played for less than the predetermined amount of time to receive a percentage of the guaranteed payment. For example, a player who has played for the half an hour preceding the time of a guaranteed payment may be eligible to receive 50% of the guaranteed payment. Therefore, one function of a database such as database 316 may be to establish a percentage of a guaranteed payment to be provided to a player depending on the time at which a player began playing at a gaming device 104.

The example proration database 316 depicted in FIG. 9 provides example data to illustrate the meaning of the information stored in this database embodiment. Five example entries are provided. Each entry corresponds to a range of times during which a player may have begun his playing session at a gaming device. Additionally, two fields are provided, indicated by reference numerals 905 and 910. The first field 905 indicates, for each respective entry, the range of times at which a player may have begun play at a gaming device. The range is indicated in terms of "minutes past the hour". Presumably, in these example embodiments, the guaranteed payment is made every hour on the hour. Thus, a player who has begun play at "0-10" minutes past the hour, as illustrated in field 905 of the first entry, will have played anywhere from fifty to sixty minutes by the time of the next guaranteed payment. It should be understood however, that database 316 does not require that a guaranteed payment be made on the hour. Field 910 indicates, for each respective entry, a percentage of the guaranteed payment to be made. For example, if the guaranteed payment is $30, and the percentage of the guaranteed payment to be paid is 75% (as indicated in field 910 for the second entry), then the player may receive a payment of 75% of $30, or $22.50.

Referring now to the first example record of database 316, a player who has begun play anywhere from "0-10" minutes past the hour (e.g., past 8:00 or past 3:00) may be eligible to receive 100% of a guaranteed payment (to be made e.g., at 9:00 or 4:00). Referring to the second example record, a player who has begun play anywhere from "10-15" minutes past the hour may be eligible to receive 75% of a guaranteed payment. Referring to the third example record, a player who has begun play anywhere from "15-30" minutes past the hour may be eligible to receive 50% of a guaranteed payment. Referring to the fourth example record, a player who has begun play anywhere from "30-50" minutes past the hour may be eligible to receive 25% of a guaranteed payment. Referring to the fifth example record, a player who has begun play anywhere from "50-60" minutes past the hour may be eligible to receive 100 of a guaranteed payment. However, such a guaranteed payment will be "paid the following hour." For example, if a player begins play at 8:55, then the player may receive 100% of a guaranteed payment, but not of a payment scheduled for 9:00. Rather the player may receive 100% of a payment scheduled for 10:00. It should be noted that, in one or more embodiments, it may be assumed that not only does a player begin play at for example, five minutes past the hour, but also continues playing up until the time of a guaranteed payment. Otherwise, the player may not receive the guaranteed payment, in some embodiments.

Referring now to FIG. 10, the guaranteed payment amount database 318 of FIG. 3 is described in greater detail. FIG. 10 illustrates an exemplary relationship describing the amount of a guaranteed payment to be provided to a player as a function of both the player's average wager size and as a function of the number of handle pulls made by the player. Although not indicated in the database 318, a particular time frame may be assumed, in one or more embodiments. For example, database 318 may describe the amount of a guaranteed payment as a function of an average bet made, and a number of handle pulls completed over the course of an hour-long period preceding the time of a guaranteed payment. One or more embodiments of the present invention may require that a player meet certain eligibility criteria in order to obtain a guaranteed payment of a certain amount. Such eligibility criteria may include the player's having completed a certain number of handle pulls, or having made wagers of a certain average size. A database such as database 318 may, in one or more embodiments, codify such criteria for reference by gaming device 104 in determining the size of a guaranteed payment to be made to a player.

The example guaranteed payment amount database 318 depicted in FIG. 10 provides example data to illustrate the meaning of the information stored in this database embodiment. Three summary fields are provided, with reference numerals 1005, 1010, and 1040. Field 1005, labeled "Guaranteed Payment Amount", indicates that data stored within database 318 corresponds to the amount of a guaranteed payment corresponding to the particular criteria indicated by other fields, to be described shortly. Field 1010, labeled "Number of Handle Pulls Made", is a summary field indicating one of the criteria used to determine the guaranteed payment amounts. Fields 1015, 1020, 1025, 1030, and 1035 indicate particular ranges of numbers of handle pulls made by a player. Field 1015 indicates a range of "0-99" handle pulls made. Field 1020 indicates a range of "100-199" handle pulls made. Field 1025 indicates a range of "200-299" handle pulls made. Field 1030 indicates a range of "300-399" handle pulls made. Field 1035 indicates a range of "400+", or more than 400 handle pulls made.

Field 1040 is another summary field indicating another one of the criteria used to determine the guaranteed payment amount. The criterion described by field 1040 is an "average wager". Fields 1045, 1050, and 1055 indicate particular ranges of an average wager. Field 1045 indicates an average wager in the range of "$0-$0.99". Field 1050 indicates an average wager in the range of "$1.00-$1.99". Field 1055 indicates an average wager in the range of "$2.00-$3.00".

Referring now to individual example data elements, the guaranteed payment amount to be paid for an average wager in the range of "$0-$0.99" (field 1045) and for a number of handle pulls in the range of "0-99" (field 1015), is $0. For the same average wager, the guaranteed payment amount is $0 for a number of handle pulls in the range of "100-199", $0 for a number of handle pulls in the range of "200-299", $0 for a number of handle pulls in the range of "300-399", and $0 for a number of handle pulls in the range of "400+". The guaranteed payment amount to be paid for an average wager in the range of "$1.00-$1.99" (field 1050) and for a number of handle pulls in the range of "0-99" (field 1015), is $0. For the same average wager, the guaranteed payment amount is $5 for a number of handle pulls in the range of "100-199", $10 for a number of handle pulls in the range of "200-299", $20 for a number of handle pulls in the range of "300-399", and $25 for a number of handle pulls in the range of "400+". The guaranteed payment amount to be paid for an average wager in the range of "$2.00-$3.00" (field 1055) and for a number of handle pulls in the range of "0-99" (field 1015), is $0. For the same average wager, the guaranteed payment amount is $10 for a number of handle pulls in the range of "100-199", $25 for a number of handle pulls in the range of "200-299", $40 for a number of handle pulls in the range of "300-399", and $50 for a number of handle pulls in the range of "400+".

E. Process Descriptions

The systems 100A, 100B discussed above, including the hardware components and the databases, are useful to perform the methods of the invention. However, it should be understood that not all of the above described components and databases are necessary to perform any of the present invention's methods. In fact, in some embodiments, none of the above described systems 100A and 100B are required to practice the present invention's methods. The systems 100A, 100B described above are examples of systems that would be useful in practicing the invention's methods. For example, the gaming device database 210 described herein with respect to FIG. 7 is useful for scheduling and for directing when various gaming devices are to provide a guaranteed payment. However, it is not absolutely necessary to have such a database in order to perform the methods of the invention. In other words, the methods described below may be practiced using, for example, clocks that are directly coupled to the coin hoppers of gaming devices 104, 106, 108 and operable to cause payments to be made at particular time.

Figure 11:
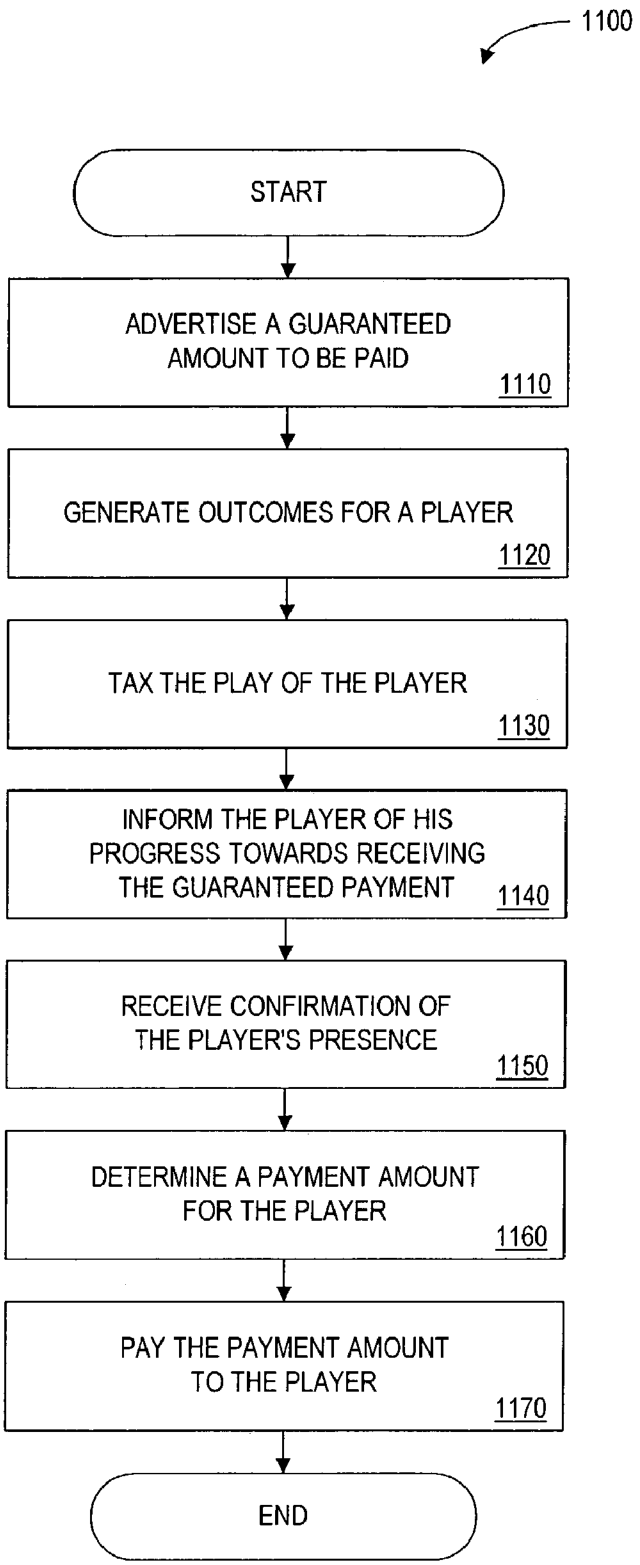
FIG. 11 is a flow diagram illustrating an exemplary process for facilitating a payment according to and for use in some embodiments of the present invention.
Figure 12:
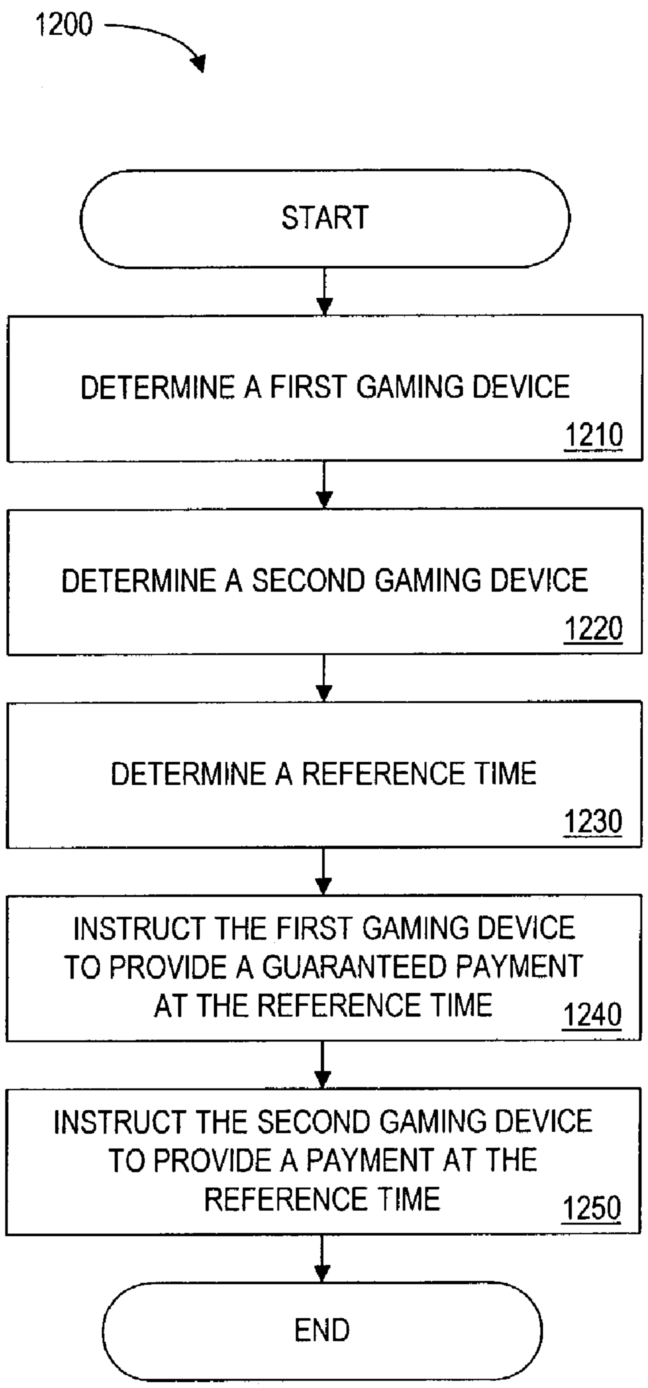
FIG. 12 is a flow diagram illustrating an exemplary process for facilitating synchronized payments among multiple gaming devices according to and for use in some embodiments of the present invention.
Figure 13:
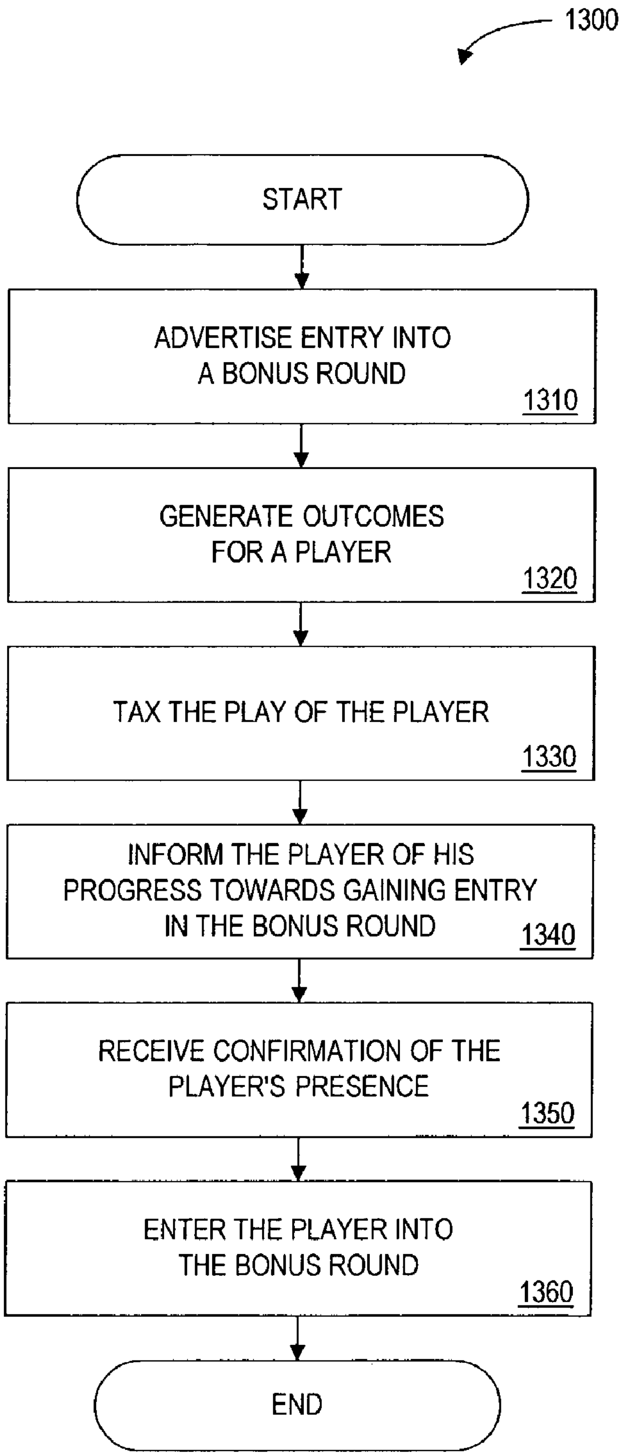
FIG. 13 is a flow diagram illustrating an exemplary process for facilitating entry into a bonus round according to and for use in some embodiments of the present invention.

Referring to FIGS. 11, 12, and 13, flow charts are depicted that represent some embodiments of the present invention that may be performed by the casino server 102, gaming devices 104, 106, 108, (112, 114), a third party server 110, and/or the casino. It must be understood that the particular arrangement of elements in the flow charts of FIGS. 11, 12 and 13, as well as the number and order of example steps of various methods discussed herein, is not meant to imply a fixed order, sequence, quantity, and/or timing to the steps; embodiments of the present invention can be practiced in any order, sequence, and/or timing that is practicable. Likewise, the labels used to reference the individual steps of the methods are not meant to imply a fixed order, sequence, quantity, and/or timing to the steps. In other words, for example, Step 1120 may be followed by Step 1110 in some situations and Step 1130 in others.

In general terms and referring to FIG. 11, method steps of an embodiment of the present invention may be summarized as follows. In Step 1110, a guaranteed amount to be paid is advertised. In Step 1120, outcomes are generated for a player. In Step 1130, the play of the player is taxed. In Step 1140, the player is informed of his progress towards receiving his guaranteed payment. In Step 1150, a confirmation of the player's presence is received. In Step 1160, a guaranteed payment amount for the player is determined. In Step 1170, the guaranteed payment amount determined at Step 1160 is paid to the player.

Turning to FIG. 12, method steps of a second embodiment of the present invention may be summarized as follows. In Step 1210, a first gaming device 104 is determined. In Step 1220, a second gaming device 106 is determined. In Step 1230, a reference time is determined. In Step 1240, the first gaming device 104 is instructed to provide a guaranteed payment at the reference time determined at step 1230. In Step 1250, the second gaming device 106 is instructed to provide a guaranteed payment at the reference time determined at step 1230.

Turning to FIG. 13, method steps of a third embodiment of the present invention may be summarized as follows. In Step 1310, entry into a bonus round is advertised. In Step 1320, outcomes for a player are generated. In Step 1330, the play of the player is taxed. In Step 1340, the player is informed of his progress towards gaining entry into the bonus round. In Step 1350, confirmation of the player's presence is received. In Step 1360, the player is entered into the bonus round.

In the subsections that follow, each of these steps will now be discussed in greater detail. Note that not all of these steps are required to perform the methods of the present invention and that additional and/or alternative steps are also discussed below. Also note that the above general steps represent features of only some of the embodiments of the present invention and that they may be combined and/or subdivided in any number of different ways so that methods of the present invention include more or fewer actual steps. For example, in some embodiments many additional steps may be added to update and maintain the databases described above, but as indicated, it is not necessary to use the above described databases in all embodiments of the invention. In other words, the methods of the present invention may contain any number of steps that are practicable to implement the several different inventive processes described herein.

More detailed reference is now made to the method steps illustrated in flow chart 1100 of FIG. 11.

Step 1110: Advertise a Payment Amount to be Paid.

In one or more embodiments, the gaming device 104 of this invention is configured to pay out a fixed amount of money at periodic intervals provided that prior to each periodic payment, the play of a player at the gaming device has met certain criteria. For example, a gaming device 104 may pay out $25 every hour on the hour, provided that during the hour-long period prior to each payment, a player at the gaming device 104 has made at least 400 handle pulls, betting $1 or more per handle pull. The periodic payment is guaranteed in the sense that it may be paid independently of the outcomes a player achieves. Whereas a conventional gaming device only pays if a player achieves a winning outcome, the gaming device of the present invention may always pay provided the player has met the aforementioned criteria.

The prospect of a periodic, guaranteed payment may be very attractive to a prospective player, and may therefore draw a player to a gaming device providing the guaranteed payment. The gaming device 104 may therefore advertise to prospective players. Such advertisements may include one or more of the following pieces of information: (i) the amount of the next guaranteed payment; (ii) the time of the next guaranteed payment; (iii) the amount of time remaining until the next guaranteed payment; (iv) the number of handle pulls required to receive the guaranteed payment; (v) the amount that must be wagered per handle pull to receive the guaranteed payment; (vi) the total amount that must be wagered in order to receive the guaranteed payment; (vii) any other criteria that must be met in order to receive the guaranteed payment; and (viii) the amount of any lesser payment that the player might still receive if he does not meet the criteria to receive the guaranteed payment. For example, even if the player does not make the full four hundred handle pulls within the next hour required to receive the $25 guaranteed payment, the player might still receive a $10 guaranteed payment if he makes more than two hundred handle pulls. Advertisements may also include the amount of the guaranteed payment that will be paid if the player does not begin playing within a given period of time. For example, a player may receive a payment of $50 at 3:00 if he begins play before 2:15. However, if the player begins play after 2:15, then the most he can receive at 3:00 is $35.

The gaming device 104 may use any communication medium available for advertising to prospective players. In some embodiments, the gaming device 104 advertises by blanking out its screen and displaying information about the guaranteed payments in large text on the otherwise blank screen. For example, as shown in FIG. 4, the screen 400 might display, "Guaranteed $50 Bonus Paid Every Hour on the Hour! Next Bonus in 55 minutes." FIG. 4 also shows e.g., as a permanent or semi-permanent fixture, a sign 418 indicating a "$50 Guaranteed Hourly Bonus". The gaming device may also broadcast audio messages of synthesized voice advertising the guaranteed payment. Other ways by which the gaming device may communicate advertising material to prospective players include: (i) text displayed on an LCD or other display screen; (ii) pre-composed text being highlighted, as through back-lighting (like a pressed elevator button); (iii) a message sent to a consumer device, such as a personal digital assistant (PDA); (iv) text printed on a paper; (v) computer synthesized voice; (vi) pre-recorded voice; (vii) braille; and (viii) sending a message to a casino representative, who then provides the message to the player.

Step 1120: Generate Outcomes for a Player.

Once a player has begun play, the gaming device 104 may receive currency from the player (e.g., via coin slot 402), receiving indications of wager amounts (e.g., via "Bet" buttons 404) receive signals from the player to initiate handle pulls (e.g., via handle 406), and generate outcomes for the player in a manner similar to that of any other gaming device. For example, once the player has made a wager and pulled the handle of the gaming device, the processor 300 of the gaming device 104 spins the reels 408, generates a random number, matches the random number to a corresponding outcome (a set of symbols such as those indicated by reference numeral 410), and causes the reels to stop in such positions so that the generated outcome is displayed to the player. The gaming device 104 then pays the player any winnings based on the generated outcome. The process may repeat itself so long as the player continues to make wagers and initiate handle pulls.

Step 1130: Tax the Play of the Player.

In some embodiments, the gaming device 104 funds the periodic guaranteed payments by withholding a portion of a player's wagers or payments in accordance with predetermined rules. The average amount withheld from a player may thereby compensate the gaming device for the amount of money it will pay out to the player at the end of each hour, or other designated interval. Exemplary rules by which the gaming device may withhold money from the player are now described.

In one or more tax embodiments, the gaming device 104 may withhold from a player any payout that would bring a player's net winnings for a session above a predetermined threshold. For example, suppose a player has begun a session at a $1 gaming device by inserting a $50 bill and receiving therefore 50 credits. The player has been playing for 20 minutes, has been doing reasonably well, and now has a credit balance of 145. The player's net winnings for the session thus far are 145−50=95 credits, assuming the player has neither inserted new credits, nor cashed out any credits since beginning the session. Now, suppose that the gaming device has a rule in place whereby it withholds from a player all winnings that would bring a player's net winnings for a session over 100 credits. So, if the player with 95 credits in net winnings for the session now gets an outcome paying 15 credits, then the player may be paid only 5 of the credits, bringing the player's net winning to 100 credits. The other 10 credits are withheld by the gaming device, since payment of the 10 credits would bring the player's net winnings over 100 credits. Now, suppose that a player makes another $1 wager and loses on the next outcome. His credit balance decrements by one. His credit balance does not remain at 150, even though 10 credits had previously been withheld.

In one or more tax embodiments, the gaming device 104 may limit the amount of a player's net winnings for a session to a predetermined number. With this tax, a player's balance may reflect net winnings exceeding the predetermined number. However, at the end of the session, or at the time of the guaranteed payment, the player will only receive net winnings up to the predetermined number. For example, if the player ends a session with a balance reflecting net winnings of $200, and the gaming device has limited net winnings to $100 for a session, then the player may only receive $100 of his $200 in net winnings when he cashes out. If the player is not playing in credit mode, then the gaming device may simply not pay the player any winnings that would bring his net winnings for a session over the predetermined number. However, the player may receive a free spin for every credit that he was not paid.

In one or more tax embodiments, the gaming device 104 may withhold a predetermined number of credits from any payout exceeding a certain threshold. For example, the gaming device withholds one credit on any payout of more than 4 credits. FIG. 8 illustrates a gaming device that applies a tax of one wager amount on any payout of five times the wager amount or more. Thus, if a player wagers 2 coins, and receives a 15-coin payout, 2 coins are withheld, since the payout of 15 coins is more than five times the wager amount of 2 coins. In FIG. 8, the applicable tax is displayed in large text alongside the pay table, so that a player is aware of the tax. Furthermore, the gaming device displays a separate balance to the player, where the balance indicates the number of credits withheld due to taxes. In the FIG., the player has just won a payout of 10 credits. Of those 10 credits, 9 were actually added to the player's credit balance, and one was withheld in taxes.

In one or more tax embodiments, the gaming device 104 may pay the player only the highest payout for any consecutive sequence of pulls in which the player has won some credits on each pull in the sequence. For example, suppose the player has made eight consecutive pulls with the following resulting payouts: 0, 10, 4, 0, 2, 5, 3, 0. The player would actually only be paid 10 coins for the second and third pulls, and 5 coins for the fifth, sixth, and seventh pulls. This is because the second and third pulls were consecutive pulls of winning outcomes. Therefore the player only gets the highest payout of the consecutive pulls, which is 10. Similarly, the highest payout from amongst the fifth, sixth, and seventh pulls is 5. Now in practice, when the player receives a winning outcome, the gaming device does not know whether the next outcome will also be a winning outcome. So the gaming device cannot know what to pay the player for the current sequence of winning pulls. Therefore, if the current payout is the first winning payout in a sequence, the gaming device may pay the player the full amount of the payout. If, however, the current payout is not the first winning outcome in a sequence, then there are two possibilities. In one possibility, the current payout is the highest payout thus far in the sequence, in which case the gaming device may pay the player the difference between the current payout and the next highest payout already to occur in the sequence. In the second possibility, the current payout is not the highest payout in the sequence, in which case the player may be paid nothing, or may have his wager returned, for a push. Going back to the first possibility, if the current payout is the highest payout in any sequence of winning outcomes, then the player may additionally be paid a single coin for every prior winning outcome present in the sequence, so as to convert such outcomes to pushes instead of losses for the player. In other variations of this tax, the player is paid only the highest n payouts in any sequence of winning outcomes in which only m outcomes were non-winning outcomes, where n and m are non-negative integers, and m is greater than or equal to n. In still another variation, the player is paid only for the lowest winning outcome in any consecutive sequence of winning outcomes, or only for the median outcome, or only for the modal outcome.

In one or more tax embodiments, the player may be paid only for the first winning outcome in any sequence of consecutive winning outcomes. Subsequent winning outcomes in the sequence may be treated as pushes, or may be treated as losses. In other variations, the player is paid only for the second winning outcome in any consecutive sequence of winning outcomes, or only for the nth winning outcome in any consecutive sequence of n or more winning outcomes (here n is a natural number). In the latter variation, if a consecutive sequence of winning outcomes is less than n, then a player may be paid only for the last winning outcome, may be paid for every winning outcome, or may not be paid for any of the winning outcomes. In another variation, the player is paid only for the last winning outcome in any consecutive sequence of winning outcome. In still other variations the player is paid only for the first and second winning outcomes in any sequence of consecutive winning outcomes, or only for the mth and nth, outcomes, or only for any other combination of winning outcomes. In still other variations, the player is paid only for the first, last, or nth outcome in any sequence of outcomes in which no more than m outcomes are non-winning outcomes. There are many other possible variations to this tax.

In one or more tax embodiments, the player may be paid only for the best line in multi-line play. For instance, if the player has enabled three paylines on the gaming device, and the outcomes for lines 1, 2, and 3 pay 5, 9, and 0 coins, respectively, then the player only receives 9 coins, not 14 coins. In variations of this tax, the player is paid for the highest two lines, the highest 10% of lines, the median line, or the lowest line.

In one or more tax embodiments, the gaming device 104 may withhold from the player a fixed percentage of any payout. For example, the gaming device withholds 5% of any payout. In many instances, the withholding of a percentage of a payout will result in the withholding of a fractional amount of a credit. For example, withholding five percent of a 10-coin payout equates to withholding one half of a credit. In some embodiments, the gaming device rounds any fractions of a credit withheld either up or down, depending on its rules of operation. Thus, even though the gaming device withholds 5% of payouts, the gaming device may withhold a full credit on a 10-coin payout after rounding up the half credit to a full credit. In another embodiment, the gaming device does not withhold fractional credit amounts, but rather keeps track of the fractional amounts of credits that would have been withheld from a player had they been whole credit amounts. Then, whenever the stored fractional amounts of credits add up to a full credit, the gaming device may withhold such a credit from the player. For example, on two consecutive pulls, a player wins 6 and then 14 credits. The gaming device pays the player six credits for his first payout, but also tracks the 5%*6 credits=0.3 credits that it would have withheld from the player.

Then, when the player achieves the payout of 14 credits, the gaming device FIG.s the withholding from the 14-credit payout as 5%*14=0.7 credits, adds the 0.7 credits to the 0.3 credits previously stored, and deducts the resultant full credit from the player's payout of 14, giving the player only 13 credits instead. Whenever the gaming device is tracking fractional amounts of credits to be withheld in the future, the gaming device may display such fractional amounts to the player. In still another embodiment, the gaming device withholds a full credit from the player anytime a player would be taxed for a fractional amount. The gaming device then tracks the fractional amounts to be withheld from the player on subsequent payouts. When the fractional amounts add up to a full credit, the gaming device and the player are even. When the fractional amounts add up to more than the full credit already withheld, the gaming device withholds another full credit. For example, on two consecutive pulls, a player wins six and then fourteen credits. A 5% tax on the first payout would amount to only 0.3 credits, but the casino withholds a full credit, paying the player only 5 credits rather than six. The second payout would be taxed for 0.7 credits. However, since the casino has already withheld a full credit when the player only owed 0.3 credits, the 0.7 credit tax has already been paid. So now, the player and the casino are even.

In one or more tax embodiments, the player may receive only the highest payout in any sequence of two non-overlapping handle pulls. For example, the player only receives the highest payout from amongst the first and second handle pulls, and only the highest payout from amongst the second and third handle pulls. If the player achieves more than two winning outcomes in any designated group of handle pulls, then the lower of the winning outcomes may be treated as a push, and the player may receive his wager back for that handle pull. In variations of this tax, the player receives the highest n payouts in any sequence of m non-overlapping handle pulls. The player might also receive only the lowest payout, the lowest positive payout, the median payout, or the modal payout in any sequence.

In one or more tax embodiments, the player may receive only the highest payout in any sequence of two overlapping handle pulls. Thus if a player has a sequence of handle pulls resulting in payouts of, 0, 3, 8, 2, 0, 3, 5, 0, then the player receives eight coins and five coins, for a total of thirteen coins. The player receives nothing for the second or fourth pulls, because the third pull, which is in a sequence of two with both the second and fourth pulls, respectively, is higher than both the second and fourth pulls. Similarly, the player receives nothing for the sixth pull, because the seventh pull is higher.

In one or more tax embodiments, the player may begin a session with a number of credits that is less than the equivalent amount of money he has paid. For example, a player inserts $50 into a gaming device and then receives thirty credits.

In one or more tax embodiments, the player may only be allowed a certain number of winning outcomes within a given time frame. For example, the player may only win three times in any thirty-second period. If the player wins more than three times in a thirty-second period, then the third win may be a push. With such a tax in place, a player may be required to maintain a certain rate of play so that he does not pause for the remainder of a thirty-second period after having won three times. Time frames may be overlapping or non-overlapping. In the latter case, for example, the player cannot win more than three times in any rolling thirty-second period. In the former case, there are discrete thirty-second periods during which the player cannot win more than three times. However, a player can win more than three times within thirty seconds by winning twice at the end of a first period, and twice at the beginning of a second.

In one or more tax embodiments, the player may only be allowed the highest outcome during any given time period. For example, the player might get only the highest outcome from any thirty-second period. Once again, the periods might be overlapping or non-overlapping. In variations, a player is allowed the highest paying n outcomes within any given time frame. Alternatively, the player might be allowed the second highest paying outcome in any given time frame, the median paying outcome, etc.

In one or more tax embodiments, a player may be restricted to win no more than twice his prior win. For example, a player might win three coins on a first outcome. Three handle pulls later, the player may win ten coins. However, since the player's earlier win was three coins, he may now receive only six coins instead of ten, since six coins would be twice his earlier win. Now, on a subsequent handle pull, the player might win up to twelve coins (or in some embodiments, up to twenty coins, even though he was not given the full ten coins). Suppose, however, that after his win of three coins, the player's next win was one coin. Then, on a later win, the player would be restricted to a maximum of two coins.

In one or more tax embodiments, one or more coins may be taken from a player upon the occurrence of a predefined event or sequence of events. For example, every time the player loses on three consecutive spins, a coin is taken away from him. Alternatively, if a player wins three times in a row, a coin might be taken from him. In another example, if a player wins more than five coins on three consecutive spins, a coin is taken from him. In another example, if a player wins more than twenty coins in any two-minute period, then a coin is taken from him.

In one or more tax embodiments, a percentage of a player's credit balance may be taken upon the occurrence of some random event, such as an outcome. For example, an outcome consisting of three blanks on the three reels of a slot machine might cause a player to lose 1% of his balance, with a minimum of one coin. Any fractional amounts of a player's balance may be rounded up or down.

In one or more tax embodiments, a fixed amount of a player's credit balance may be taken upon the occurrence of some random event, such as an outcome. The number of credits taken may be five, ten, etc. In particular, the number of credits taken may be more than the maximum possible wager at the gaming device, or more than the player's last wager.

In one or more tax embodiments, when a player's credit balance meets certain criteria, the player may be limited as to what outcomes constitute winning outcomes, or as to how much he can win. For example, when a player's credit balance exceeds two hundred, he may only be restricted to receiving 50% of any payouts. In another embodiment, when the player's credit balance goes below zero, the player may be able to win only the jackpot. In some embodiments, when the player's credit balance first meets one of the designated criteria (e.g., when it goes over two hundred), the taxes may apply thereafter, even if the player's credit balance later ceases to meet the criteria. For example, if a player's credit balance goes over two hundred, then all future outcomes, at least for that session, may give the player only 50% of what the outcomes would normally pay. In other embodiments, the tax ceases to apply once the player no longer meets the criteria. Another way to phrase this embodiment, is that the player only receives the benefit of a full, normal, or standard pay table when his balance falls within a designated range.

Any of the taxes described herein may have exceptions to when the tax is applied. In particular, exceptions may occur when the player receives a jackpot outcome. For example, even if a tax prevents a player's balance from exceeding $150, the player's balance may go above $150 if he obtains a jackpot-winning outcome. If an outcome would ordinarily be a push (e.g., because the prior outcome was a win and a player is prevented from winning twice in a row), and a jackpot-winning outcome occurs, then the player would still be allowed to win the jackpot.

Any of the taxes described herein may also be limited such that not more than a predetermined amount of money is taken from the player during a session or during any particular time period. For example, suppose a player is taxed such that whenever he attains a streak of winning outcomes, he receives only the payout for the first outcome, and the rest of the outcomes in the streak are treated as pushes. So if a player were to lose on a first pull, and then achieve consecutive outcomes paying twelve, eight, and two, then the player would actually receive fourteen coins: twelve coins for the first outcome, one for the second (to repay the cost of the wager), and one for the third. In effect, the player has given up seven coins for the second outcome, and one coin for the third outcome, for a total of eight coins given up due to the tax. If, at the end of twenty minutes, the player has given up more than thirty coins due to the tax, then the excess coins may be returned to the player. Alternatively, if the player has paid thirty coins due to the tax, prior to the expiration of the twenty-minute period, then the tax may no longer apply until the twenty-minute period has expired.

The taxes described herein, when applied, result in the gaming device 104 collecting a certain average amount of money in excess of its typical earnings. For example, a gaming device may typically earn an average of $25 when played for an hour (assumed to be five hundred pulls) at $1 per pull. However, when a tax is applied, the same gaming device may earn $45 per hour. The tax may therefore be said to have a value of $20 per hour, since the gaming device is earning $20 more per hour with the tax than it would have without the tax. In many embodiments, it is the extra value derived from the tax that is returned to the player at the end of the hour in the form of a guaranteed payment.

Below is a calculation of the value of one of the taxes mentioned above. It is assumed that the gaming device has a pay table identical to the following table taken from Jim Regan's Winning At Slot Machines, which is incorporated herein by reference:

| Hits | Outcome |
|---|---|
| 8570 | 0 |
| 680 | 2 |
| 680 | 2 |
| 200 | 5 |
| 200 | 5 |
| 68 | 5 |
| 20 | 20 |
| 42 | 10 |
| 6 | 10 |
| 42 | 20 |
| 20 | 14 |
| 5 | 14 |
| 50 | 20 |
| 4 | 18 |
| 20 | 18 |
| 20 | 20 |
| 20 | 50 |
| 1 | 100 |

In the table, "Outcome" represents the number of tokens paid, and "Hits" represents the number of times the corresponding outcome would be expected to occur in 10,648 spins, or a complete cycle of the slot machine. The probability of each outcome occurring on a single spin can be found be dividing the "Hits" entry by 10,648. For example, the probability of the outcome that pays 100 tokens appearing on a single spin is $1/10{,}648 \approx 9.39*10^{-5}$.

Now, if a player inserts a single token into the slot machine, his expected winning are given by:

$$EV = 0*8570/10{,}648 + 2*680/10{,}648 + 2*680/10{,}648 + 5*200/10{,}648 + \ldots + 100*1/10{,}648 \approx 0.9450$$

Therefore, for every token the player inserts, he can expect to receive 0.945 tokens back, making for a hold percentage of: $1-0.9450 \approx 0.05503$, or 5.503%. After an hour's worth of play (at 500 handle pulls per hour), at $1 per handle pull, the gaming device can expect to earn:

$$\text{Hold Percentatge} \times \text{Number of Pulls} \times \text{Wager per pull} = 5.503\% \times 500 \times \$1 \approx \$27.51$$

Suppose now that one of the aforementioned taxes is applied, where one credit is withheld from the player for every payout of more than 4 credits. The result for the player is illustrated below. The outcomes of the payout table are the same. However, what the player actually receives is a little different.

| Hits | Received | Outcome |
|---|---|---|
| 8570 | 0 | 0 |
| 680 | 2 | 2 |
| 680 | 2 | 2 |
| 200 | 4 | 5 |
| 200 | 4 | 5 |
| 68 | 4 | 5 |
| 20 | 19 | 20 |
| 42 | 9 | 10 |
| 6 | 9 | 10 |
| 42 | 19 | 20 |
| 20 | 13 | 14 |
| 5 | 13 | 14 |
| 50 | 19 | 20 |
| 4 | 17 | 18 |
| 20 | 17 | 18 |
| 20 | 19 | 20 |
| 20 | 49 | 50 |
| 1 | 99 | 100 |

Now, if a player inserts a single token into the slot machine, his expected winnings, calculated using the "Received" line above, and are given by:

$$EV = 0*8570/10{,}648 + 2*680/10{,}648 + 2*680/10{,}648 + 4*200/10{,}648 + \ldots + 99*1/10{,}648 \approx 0.8775$$

The hold percentage of the gaming device is now $1-0.8775 \approx 0.1225$, or 12.25%. After an hour's worth of play (at 500 handle pulls per hour), at $1 per handle pull, the gaming device can expect to earn:

$$\text{Hold Percentatge} \times \text{Number of Pulls} \times \text{Wager per pull} = 12.25\% \times 500 \times \$1 = \$61.23$$

The tax value is then $61.23–$27.51=$33.72

Therefore, the gaming device 104 might comfortably assess a tax of one coin on any payout of four coins or more, and use the tax to make a guaranteed payment at the end of an hour of up to $33.72, while still maintaining its profitability.

One advantage of the application of a tax is that the payout table of the gaming device 104 need not be changed. Rather, the tax serves as an extra rule that applies over and above the payout table. Therefore taxes may be used to collect more money to pay for player benefits, without retrofitting machines to give them new payout tables.

In one or more embodiments of the present invention, there is no explicit tax applied. Rather the payout table may be so constructed that the expected hold of the gaming device 104 during the period prior to the payment of a guaranteed payment will, on average, pay for the guaranteed payment, and may additionally provide the gaming device with a predetermined profit. Unlike the scenario in the previously illustrated example, the payout table itself does change. For example, suppose that the payout table of the gaming device is designed for a hold percentage of 5%. That is, the gaming device expects to pay out ninety-five cents for every dollar that is wagered, and to keep five cents for itself. Over the course of five hundred pulls, a typical hour's worth of play, with $1 wagered per pull, the gaming device can expect to earn:

$$\text{Hold Percentatge} \times \text{Number of Pulls} \times \text{Wager per pull} = 5\% \times 500 \times \$1 = \$25$$

Suppose now that a designer of the gaming device would like to maintain the profitability of the gaming device 104 at $25 per hour, but also pay out a guaranteed payment amount of $25 at the end of an hour, assumed to be five hundred pulls. The game designer may accomplish this goal by designing the pay table of the gaming device to have a hold percentage of 10%. Now, after an hour (five hundred pulls), the gaming device can expect to earn:

$$\text{(five hundred pulls), the gaming device can expect to earn}: 10\% \times 500 \times \$1 = \%50.$$

However, once the gaming device 104 pays the $25 guaranteed payment at the end of the hour, the gaming device will retain $25 in profits, on average.

Many of the taxes described above are designed to be as tenable as possible for the player. For example, a one-coin tax on any payout of five coins or more means that currency will only be withheld from a player when he has won a fairly significant outcome. At such times, the player is more likely to be happy about his winning outcome than to be unhappy at the tax, just as poker player is happy to win a pot even though the casino takes a few chips from the pot (e.g., as a standard casino rake). A similar situation applies when winnings are taxed at 5%. The amount of the tax will likely seem insignificant in relation to the win the player has just obtained. Thus, currency can be taken from players in the form of taxes at times when a player is least likely to miss the lost currency, and given back to players at times when the currency may have the most impact. The result may be a better overall experience for the player.

Step 1140: Inform the Player of His Progress Towards Receiving the Guaranteed Payment.

Throughout the player's session, the gaming device 104 may track his play. The gaming device 104 may track any one or more of the following aspects of play, and record such aspects in a database such as the current session database 314 of FIG. 8: (i) the time at which the player began a gaming session 810; (ii) the particular tax that is applicable to a gaming session 815 (although the tax illustrated in database 314 is "second consecutive win is a push", any of the taxes described herein may be applicable to one or more sessions); (iii) the time at which the player initiates each handle pull 825; (iv) the amount the player wagers on each handle pull 830; (v) the outcome a player has received on each handle pull 835; (vi) the payout that corresponds to each respective outcome received by the player 840; (vii) the amount actually paid 845 for each respective outcome 835; (viii) the amount withheld (e.g., in taxes) 850 from each respective payout 840; (ix) the time between when the player initiates a first handle pull, and the player initiates a subsequent handle pull; (x) the time at which the player selects pay lines to enable for each handle pull; (xi) the time at which the player selects a wager amount for each handle pull; (xii) the cumulative number of handle pulls the player has initiated since the start of the player's session; (xiii) the cumulative amount of wagers the player has made since the start of the player's session; (xiv) the duration of any pauses in play, e.g., of bathroom or coffee breaks; and (xv) the amount of time that has elapsed since the player began his session.

The gaming device 104 may likewise inform the player of various statistics about his play, including how many handle pulls the player has made in his session, the cumulative number of wagers the player has made in this session, and so on. The gaming device may determine such statistics, for example, through the application of well known mathematical operations by processor 300 to the information stored in database 314. For example, the processor 300 may add the amounts wagered for all handle pulls within a session in order to determine a total amount wagered for a session. The gaming device may inform the player via text displayed on its display screen, via an LCD counter, via a speaker, or via any other means.

In FIG. 5, the gaming device 104 displays several statistics for the player. At 502 is displayed, on the screen of the gaming device, the tax that is applicable to the player's session. The indicated tax is "one wager amount withheld on any payout of five times the wager amount or higher". At 504 is displayed a number of credits won by the player during the most recent handle pull. The illustrated payout of 10 credits corresponds to the outcome "lemon-lemon-bar" 410 displayed on the reels 408 of the gaming device. The payout for the outcome "lemon-lemon-bar" can be readily seen by looking up the outcome on the payout table illustrated on the left side of screen 400 in FIG. 5. At 506 is displayed a number of credits ("10") paid to the player for the most recent spin. At 508 is displayed a number of credits ("1") withheld from the player for the most recent spin. At 510 is displayed the player's current credit balance of "120". At 420 is displayed the amount of time the player has remaining until the payment of the next guaranteed bonus. The time of "25:10" indicates twenty-five minutes and ten seconds remaining.

The gaming device 104 may determine criteria for a player to meet in order for the player to receive a guaranteed payment. Exemplary criteria are described in the proration table database 316 of FIG. 9, and in the guaranteed payment amount database 318 of FIG. 10. According to the proration table database 316, a player may be eligible for a specified percentage of a guaranteed payment (indicated in field 910) provided he has begun his session within a specified time period (indicated in field 905). For example, suppose a guaranteed payment is $50, and that the next guaranteed payment is 4:00. Proration table database 316 suggests that the player will be eligible for 100% of the guaranteed payment (e.g., for all $50), if the player has begun his session between 3:00 and 3:10. In other words, if the player has begun his session within the range of "0-10" minutes past the hour prior to the payment of a guaranteed payment, then the player will be eligible to receive 100% of the guaranteed payment. Proration table database 316 also suggests that if a player has begun his session between 3:10 and 3:15, then he will be eligible for 75% of the guaranteed payment amount, or 75%×$50=$37.50. If the player has begun his session between 3:50 and 4:00, then proration table database 316 suggests that the player will not be eligible for the guaranteed payment made at 4:00, but will be eligible for the next guaranteed payment which will be paid presumably at 5:00.

In one or more embodiments, the system of limiting the amount of a guaranteed payment to a player based on the time at which he began a session is warranted, because the guaranteed payment may be funded using taxes withheld from the player. Thus, if a player has not played for a sufficient period of time prior to the time of a guaranteed payment, then the player is unlikely to have paid enough taxes to equal the amount of the guaranteed payment. The gaming device would then lose money by providing the player with the full amount of the guaranteed payment.

Referring to the guaranteed payment amount database 318 of FIG. 10, other criteria are provided for a player to be eligible to receive guaranteed payments of various amounts. As suggested by database 318, a player may become eligible to receive a guaranteed payment of a particular amount if he has completed a number of handle pulls falling within a predefined range, and if he has also placed wagers of an average size falling within a predefined range. For example, to be eligible for a guaranteed payment of $10, a player may complete anywhere from "200-299" 1025 handle pulls, with average wager size over those handle pulls falling in the range of "$1.00-$1.99" 1050. Note that the player may also be eligible to receive a guaranteed payment of $10 by completing from "100-199" handle pulls 1020, with average wager size over those handle pulls of "$2.00-$3.00" 1055.

When a player meets the one or more criteria set out in database 318, the player may have contributed a sufficient amount of funds in the form of taxes so as to make it worthwhile for the casino to return those funds in the form of a guaranteed payment. For example, the more handle pulls a player makes, the more he is likely to contribute in taxes, and therefore the larger of a guaranteed payment he may receive. Similarly, the more the player has wagered, on average, the more he is likely to have paid in taxes, and therefore the larger of a guaranteed payment he may receive. It should be noted, however, that a player may receive a guaranteed payment even if taxes have not been collected from the player. For example, a casino may be willing to provide a player with a guaranteed payment amount because the casino has profited from the large amount of gaming activity of the player in conjunction with the house advantage enjoyed by the casino.

Once the gaming device 104 has determined one or more statistics concerning the player's session, and has determined eligibility criteria for receiving a guaranteed payment, the gaming device may inform the player of what he must do in order to achieve the guaranteed payment. For example, the gaming device may inform the player that he needs only make 80 more pulls to get the payment, or that he need only play five more minutes to get the payment.

In one or more embodiments, the gaming device 104 may employ a visual display graphically illustrating the player's progress towards meeting one or more criteria for receiving the guaranteed payment. For example, if the player must make four hundred pulls in an hour in order to receive the guaranteed payment, then a graphically displayed thermometer may show a column of mercury whose height is proportional to the number of handle pulls the player has made. The mercury may reach the top of the thermometer when the player reaches four hundred pulls. Thus, by looking at the thermometer, the player may get an idea of how many pulls he must make in order to receive the guaranteed payment. Many similar graphical depictions of the player's progress are possible.

In some embodiments, the gaming device may inform the player of whether he is on track to receive the guaranteed payment. In one sense, a player is on track if, by continuing the average rate of play he has maintained since the start of his session, he will have met the criteria for receiving the guaranteed payment at the time when the guaranteed payment will be paid. As an example, suppose a player begins a session at 12:10. He must make 400 pulls by 1:00 in order to receive a guaranteed payment of $25 at 1:00. If, by 12:35, the player has made 200 pulls, then he is on track to receive the guaranteed payment. This is because he has made 200 pulls in 25 minutes. If he makes the same number of pulls within the next 25 minutes, then he will have made 400 pulls by 1:00 and will therefore receive the guaranteed payment. There are other senses in which a player may be on track. For example, a player may be on track to receive the guaranteed payment if he maintains the rate of play that he has made in the last 10 minutes of play. For example, suppose a player begins play at 12:15, and must make 400 pulls by 1:00 in order to receive a $20 guaranteed payment. In the first 15 minutes, the player only makes 100 pulls. Therefore, based on his first 15 minutes of play, the player is not on track to receive the guaranteed payment. However, suppose now that the player speeds up his rate of play, and makes 75 pulls in the next 7 minutes and 30 seconds. So by 12:37:30, or half way through his session, the player has made 175 pulls. Based on the player's total session, he is not on track to get the guaranteed payment, since he has made less than half the required number of pulls in half of the time from when he started until when the guaranteed payment is to be paid. However, based on his last 7.5 minutes of play, the player is on track to receive the guaranteed payment, since he needed to make 300 pulls from 12:30 to 1:00, and he has made one quarter of the 300 pulls (75 pulls), in one quarter of the time from 12:30 to 1:00. So a player may be said to be on track based on the number of pulls he has made since the start of his session, based on the number of pulls he has made in the last x minutes, based on some weighted average of his rates of play over the course of his session, or based on other criteria.

The gaming device 104 may inform a player of when he is on track to meet the criteria for receiving a guaranteed payment, without informing the player of what the criteria are, nor of how close the player is, in absolute terms, to meeting the criteria. It is as if the gaming device were telling a runner to keep running at his current pace in order to break the record, but not telling the runner how much further he needs to run. For example, a gaming device might display text to a player saying, "Keep up your current rate of play, and you'll get the guaranteed payment!"

In some embodiments, the gaming device 104 signals to the player whether or not he is on track to receive the guaranteed payment by depicting the player in one of a number of possible states. For example, the gaming device illustrates three possible states. In one state, the player is well on track to receive the guaranteed payment. The player may, for instance, be able to slow his rate of play by up to 5% and still receive the guaranteed payment. In another state, the player is only barely on track to receive the guaranteed payment. If the player slows down at all, he risks not meeting the criteria for receiving the guaranteed payment. In the third state, the player is not on track to receive the guaranteed payment, and must increase his rate of play in order to have any chance of receiving the guaranteed payment. The gaming device may depict the three states by lighting one of a red, yellow, or green light. Exemplary such lights are depicted in FIGS. 4 and 5, indicated by reference numerals 412, 414, and 416. If the player is comfortably on track, then the green light 416 remains lit. If the player is barely on track, the yellow light 414 is lit. If the player is not on track, then the red light 412 is lit. A player who is in one state may transition to another. For instance, a player who is in the green state may slow his rate of play, and thereby gradually drift into the yellow state, or even the red state. Similarly, a player in the red state may increase his rate of play and climb into the yellow state or even the green state. In FIGS. 4 and 5, the red light 412 is labeled "Pick up the pace," the yellow 414 is labeled "Caution," and green 416 is labeled "On track." As illustrated in FIG. 5, the "On track" light is lit, indicating that the player will receive the $50 guaranteed payment if he maintains his current rate of play.

Of course, there may be more or less than three states. For example, there may be only two states, one for when the player is on track, and one for when he is not. Also, states may be depicted in a number of other ways. For example, a light on the gaming device may remain off while the player is comfortably on track, may start flashing when the player is barely on track, and may remain solidly on while the player is not on track.

Additional states may inform the player with absolute certainty whether he will or will not receive the guaranteed payment. For example, at five minutes until the hour, a player may have fully met the criteria for receiving a guaranteed payment. Now, a purple light may light up to show that the player need not make any further handle pulls. Another possibility is that, at 5 minutes to the hour, the player still has so many handle pulls to go that, even if he plays the gaming device at its maximum possible speed, he will still not receive the guaranteed payment. Thus, a brown light may light up, showing that the player cannot possibly receive the guaranteed payment.

States may also occur along a continuum rather than as two or three discrete states. For example, a light, or a portion of the display screen, may be capable of displaying all the colors of the rainbow. The color of the light may vary continuously to illustrate the degree to which the player is on track. When the color is towards the violet end of the spectrum, the player is well on track. When the color is towards the red end of the spectrum, the player is not on track. A continuum of states may also be depicted using the brightness of a light, or using the angle of a needle, much as the fullness of a gas tank is often illustrated with a needle. Many other methods of illustrating a continuum of states are possible.

In some embodiments, the gaming device 104 may track the player, and may inform the player of his progress with respect to more than one possible goal. For example, a player may receive a guaranteed payment of $50 at the end of an hour if he makes 400 pulls by the end of the hour, but he may receive $25 if he makes anywhere from 200 to 399 pulls. In this example, the gaming device may employ two sets of lights, one showing whether the player is on track to receive the $50 payment, and one showing whether the player is on track to receive the $25 payment.

In some embodiments, the gaming device 104 may initiate handle pulls for the player automatically, so as to ensure that the player can meet the criteria for receiving the guaranteed payment. The automatic initiation of handle pulls may be conditioned upon the player having enough coins deposited into the gaming device to pay for the handle pulls. When a gaming device initiates handle pulls automatically, it may be able to make handle pulls at a much faster rate than a player would be able to if operating the gaming device manually. Therefore, even if the player must still make a relatively large number of handle pulls in a relatively short period of time in order to receive the payment, the gaming device may be able to ensure that the player meets his goal. In some embodiments, the gaming device may determine from monitoring the player's play, or through some other means, that the player is not on track to achieve the guaranteed payment. The gaming device might then communicate a question to the player, asking whether the player would like the gaming device to commence automatic play for the player so that he may be sure of getting the payment. The gaming device may communicate to the player any conditions necessary for the gaming device to commence automatic play. For example the gaming device might inform the player that he must deposit additional money into the gaming device so as to be sure the gaming device can make a large number of pulls without the player running out of money. The gaming device may also ask for the player's express consent for it to take over automatic play. For example the gaming device might ask the player to say, "I agree" into a microphone, to enter a PIN code or password, or to make some other acknowledgement of his agreement.

In one or more embodiments, the gaming device may automatically initiate handle pulls without the express consent of the player. In one or more embodiments, when the player first begins a session, the player may consent to having the gaming device take over play should the player not stay on track to receive the guaranteed payment. Then, if the player later gets off track, the gaming device may take over without having to ask for the player's consent again.

In one or more embodiments, the gaming device may allow the player to manually initiate handle pulls. However, if the player does not initiate a handle pull within a given time period, say 6 seconds, then the gaming device may initiate the handle pull automatically. In this way, the player may still maintains a measure of control, while the gaming device ensures that the player takes no more than six seconds per handle pull. The gaming device may thereby ensure that the player gets the guaranteed payment.

The gaming device 104 may inform the player of how much time remains until the payment of the guaranteed payment. For example, the gaming device may display a clock that counts down the hours, minutes, seconds, etc., until the payment of the next guaranteed payment, or until the payment of the next payment for which the player is eligible. As mentioned herein, FIG. 4 and FIG. 5 illustrate a gaming device containing a clock 420. In FIG. 4, there are fifty-five minutes remaining until the time of a guaranteed payment. In FIG. 5, the clock tells the player that he has twenty-five minutes and ten seconds left until the payment of the guaranteed payment. By keeping a player aware of his remaining time, the gaming device may help ensure that the player does not plan to leave too early. It is further worth noting that a casino may wish to inform the player of the time remaining until a payment is paid, without telling the player the current time of day, and/or without telling the player the actual time of day at which the payment will be paid. Casinos often do not like to display the time of day, because they want to create an atmosphere where time doesn't matter. Therefore, as illustrated in FIG. 5, a gaming device may only inform a player of how much time remains until a payment is to be paid.

Step 1150: Receive Confirmation of the Player's Presence.

In one or more embodiments, it is desirable that the gaming device 104 pay any guaranteed payment only when a player is present at the gaming device to receive the payment. If a player has stepped away from a gaming device after 40 minutes of play, and the gaming device pays the guaranteed payment, then another person is liable to walk by and to take some of the coins that have dropped into the player's coin tray. Note that during typical current practice, a gaming device need not check that a player is present when providing a payout. This is because the payout is usually the result of the player initiating a handle pull only a few seconds before, and the player is unlikely to have left the gaming device since initiating the handle pull. However, in the case of the present invention, the payment or non-payment of a guaranteed payment can be influenced by player actions from forty minutes or more prior to the time of the payment. Thus, it is quite possible that a player will have walked away from the gaming device, for any number of reasons, before he has received the guaranteed payment.

Therefore, in some embodiments, the gaming device 104 prompts a player to confirm his presence at a gaming device at predetermined times prior to the time of the guaranteed payment. Supposing the guaranteed payment occurs on the hour, the gaming device may prompt the player at ten minutes to the hour, at five minutes to the hour and/or at one minute to the hour. The gaming device may also prompt the player to confirm immediately prior to the payment of the guaranteed payment. Of course, the amount of time until the hour at which the gaming device prompts the player may be any number of minutes, and the gaming device may prompt the player any number of times. If the player is in the middle of a spin at exactly ten minutes to the hour, then the gaming device may wait until after the spin has finished before prompting the player. Alternatively, if it is within a predetermined number of seconds until ten minutes to the hour, the gaming device may prompt the player then.

The gaming device 104 may also prompt a player to confirm his presence if there is any pause in the player's play. For example, if a player waits more than one minute since the resolution of a prior outcome, until initiating a handle pull for the subsequent outcome, then the gaming device may prompt the player to confirm that he is still present. The gaming device may also check for pauses in play that are long only in relation to the player's typical play as monitored by the gaming device. For example, if a player typically spends fifteen seconds between handle pulls, then the gaming device may not prompt the player unless he has paused for more than a minute. In contrast, if a player typically spends three seconds between handle pulls, then the gaming device may prompt the player if he pauses for more than thirty seconds.

The gaming device may prompt the player by displaying a text message to the player, by using a computer synthesized or prerecorded voice, or by any other communication means described above. For example, the gaming device may display a text message to the player saying, "Please press any button to confirm that you are still here."

It may also be desirable that a player not only confirm his presence at the gaming device, but also confirm his identity. Otherwise, if one player gets up, another person may sit down, immediately confirm his own presence, and continue where the prior player left off, and thereby benefit unfairly from the play of the prior player. Therefore, the gaming device 104 may prompt the player to enter a password, to insert his player-tracking card, to insert his credit card or provide a credit card number, to insert his license, to answer a question (e.g., about his mother's maiden name), or to provide a biometric confirmation. A biometric confirmation of the player's identity may involve any one of the following: (i) thumb print; (ii) retinal scan; (iii) voice print; (iv) DNA sample analysis; (v) facial recognition; (vi) analysis of the player's play signature (e.g., the pattern with which the player presses the button, how hard the player pulls the handle); (vii) handwritten signature analysis; (viii) heart rate/blood pressure/cholesterol analysis; and (ix) height/weight measurement. Thus, a gaming device 104 may include the additional hardware required to support biometric confirmation of the player's identity.

If a player does not confirm his presence or identity within a predetermined period of time, e.g., within one minute of being prompted, then the gaming device 104 may disqualify all preceding play in relation to the next guaranteed payment. However, play from that moment forward may still qualify. For example, suppose a player needs five hundred pulls to receive a guaranteed payment at the end of an hour. The player has made two hundred pulls when suddenly he remembers that he had to meet a friend for lunch. He takes his bucket of coins, and leaves. The gaming device 104 senses that the player is no longer initiating handle pulls. After one minute, the gaming device displays a text message asking the player to confirm his presence by pressing any button. Additionally, a clock showing thirty seconds appears beneath the text message. The clock counts down to zero. When the player, who is no longer present, has not confirmed his presence after thirty seconds, the gaming device disqualifies the player's two hundred pulls. Now, if any new player sits down at the gaming device, the new player must make the original five hundred pulls in order to receive the full guaranteed payment. Had the old player stayed at the gaming device, he would have had to make only three hundred more pulls.

In one or more embodiments, a player may be prompted to confirm his mere presence and fail to do so. The gaming device 104 may therefore disqualify his preceding pulls in relation to the guaranteed payment. However, the player may later resume play, and have the preceding pulls re-qualified, provided he now confirms not only his presence, but also his identity.

In one or more embodiments, a player must have his player-tracking card inserted in order to qualify for the guaranteed payment. If, at any time, the player withdraws his player-tracking card, then the gaming device 104 may disqualify all prior play. In some embodiments, however, the player may be given a limited time window during which to reinsert his tracking card and still receive the benefit of prior play. Note that if a new player were to insert his own tracking card within the given time window, the new player would not receive the benefit of the old player's play. The reinserted tracking card must be the same as the original tracking card in order to receive the benefit of the earlier play.

In one or more embodiments, the gaming device 104 may disqualify preceding play towards a guaranteed payment if a player cashes out. The gaming device may assume that the implication of the player's cashing out is that he is ending his session. However, if the player later types in some identifying information, such as a birthday or a personal identification number, his preceding play may no longer be disqualified.

In one or more embodiments, the gaming device 104 may disqualify preceding play, after a sufficient pause in play, only if there is also a zero credit balance on the gaming device. In such embodiments, the gaming device may assume that, with a non-zero credit balance, a player is still present at a machine even if he is not initiating handle pulls for some period of time.

In one or more embodiments, if the gaming device 104 detects that a player's tracking card has been removed, and a new tracking card inserted, then the gaming device may assume that the first player's session has ended, and disqualify all preceding play for the current period towards the next payment.

In one or more embodiments, the player may inform the gaming device 104 in advance that he will take a break. For example, the player presses a "Take a 5-minute Break" button on the gaming device, so as to have time to visit the restroom facilities. In this case, the gaming device may avoid disqualifying the player's preceding play when there is a pause in play, since the player has demonstrated an intention to later resume play. However, if the pause in play gets to be significantly longer than what the player asked for, then the gaming device may ultimately disqualify preceding play. For example, the aforementioned player may not return to the gaming device even after five minutes has elapsed, in which case his prior play may be disqualified. The gaming device may limit the number of breaks allowed. For example, only one break per hour may be allowed. The gaming device may limit when breaks are allowed. For example, a single break may be allowed only after the player has played for twenty minutes or more. A gaming device may also limit the duration of breaks. For example, breaks of up to only five minutes may be allowed, or breaks of only up until two minutes before the payment of the guaranteed payment. By limiting the times, durations, and frequencies of breaks, the gaming device may encourage a player to provide an adequate amount of play to receive the guaranteed payment.

In one or more embodiments, a gaming device 104 may actually "freeze" upon the request of the player, and not allow other players to use the gaming device until the player returns and unfreezes the gaming device or until a predetermined amount of time has elapsed. When a player freezes a gaming device, he may later return and resume play, without having his preceding play disqualified in relation to the guaranteed payment.

Step 1160: Determine a Payment Amount for the Player.

The payment amount paid to the player may be based on a number of factors. It is one object of the present invention to provide a guaranteed payment on a periodic basis, and to provide such a payment to any player who has played at the gaming device for the entire period leading up to the payment of the guaranteed payment. For example, if a guaranteed payment is to be paid every hour on the hour, then a player who has played for the entire hour-long period leading up to a new hour will receive the guaranteed payment. However, it is understood that often, players will not play for the entire period leading up to a scheduled guaranteed payment. For example, if a guaranteed payment is scheduled to be paid at a gaming device every hour on the hour, a player may begin play at the gaming device at 12:30. Thus, by 1:00, the player will have played only half an hour, rather than for the full hour-long period preceding the 1:00 payment. However, in many embodiments, it is still desirable to pay a secondary guaranteed payment to a player even if he has not met the criteria for receiving a primary guaranteed payment. For example, a player who begins play at 12:30 may only receive half of the payment amount that would be paid, at 1:00, to a player who began play at 12:01.

Possible criteria for receiving a guaranteed payment at a designated time, T, are now described. One exemplary criterion for the player receiving a guaranteed payment at designated time, T, is that the player has begun play at a gaming device more than a predetermined period of time prior to T. For example, the player has begun play more than fifty minutes prior to T.

Another exemplary criterion for the player receiving a guaranteed payment at designated time, T, is that the player has begun play at a gaming device more than a predetermined period of time prior to T, and has maintained such play continuously (e.g., with no more than fifteen seconds between handle pulls), or has maintained such play continuously with less than or equal to a predetermined number of breaks, or less than or equal to a predetermined amount of time during which the player was not playing.

Another exemplary criterion for the player receiving a guaranteed payment at designated time, T, is that the player has played for a certain total period of time prior to T, including the time from beginning play minus the time of any pauses in play.

Another exemplary criterion for the player receiving a guaranteed payment at designated time, T, is that the player has made a certain number of handle pulls prior to T.

Another exemplary criterion for the player receiving a guaranteed payment at designated time, T, is that the player has played a certain total number of pay lines prior to T. For example, if a player has made one hundred pulls at two pay lines per pull, the player has played two hundred pay lines.

Another exemplary criterion for the player receiving a guaranteed payment at designated time, T, is that the player has made a certain total number of handle pulls prior to T, in each of which the player played at least n pay lines, where n might be any natural number.

Another exemplary criterion for the player receiving a guaranteed payment at designated time, T, is that the player has made a certain total number of handle pulls prior to T, in each of which the player has wagered a certain minimum amount.

Another exemplary criterion for the player receiving a guaranteed payment at designated time, T, is that the player has made a certain total number of handle pulls prior to T, where the player's wager has averaged more than a minimum amount over the total number of pulls.

Another exemplary criterion for the player receiving a guaranteed payment at designated time, T, is that the player's wager amounts prior to T total more than a required amount.

Another exemplary criterion for the player receiving a guaranteed payment at designated time, T, is that the player and one or more friends or teammates have, as a group, made a predetermined number of pulls, played for a predetermined amount of time, played a predetermined number of pay lines, wagered a predetermined amount, etc., in the period prior to T.

It will be appreciated that many other criteria can be used for paying a guaranteed payment to a player. Also, in the criteria listed above, there may be an initial time before which play does not count towards a payment. For example, if a payment is to be paid at 2:00, then any play before 12:50 may not count towards the 2:00 payment. Thus, if a player were required to make five hundred pulls in order to receive the 2:00 payment, then the player would have to make such pulls between 12:50 and 2:00.

Now, scenarios when the player does not fully meet the criteria for receiving a guaranteed payment will be described. In one or more embodiments, when a criterion for receiving the payment can be expressed in a quantitative format, the payment may be paid to a player proportionally based on what percentage of the criterion he has satisfied. For example, if a player must wager a total of $250 to receive a $25 payment at the end of a half-hour period, and the player wagers only $200 (80% of the required amount of play), then the player may receive only $20 of the payment (80% of the original payment). If the portion of a payment that a player receives would be a fractional amount of money, coins, credits, or the like, then the amount of the payment the player receives may be rounded up or down.

The portion of a payment a player receives may also be tiered based on whether the player's play with respect to a quantitative criterion (or criteria) has surpassed certain designated thresholds. For example, if a payment amount is $100, and a player must bet a total of two thousand pay lines over the course of a session in order to receive the payment, then the following partial payments may be paid to the player if he does not play the full two thousand pay lines: (i) $0 if the player plays between zero and four hundred ninety-nine pay lines; (ii) $25 if the player plays between five hundred and nine hundred ninety-nine pay lines; (iii) $50 if the player plays between one thousand and one thousand four hundred ninety-nine pay lines; and (iv) $75 if the player plays one thousand five hundred and one thousand nine hundred ninety-nine pay lines.

Another example considers the amount of time a player has played prior to the paying of the guaranteed payment. Suppose a guaranteed payment of $25 is paid at the end of an hour. The player may receive the following payment amounts depending on his amount of play: (i) $0 if the player plays less than ten minutes; (ii) $6.25 if the player plays anywhere from ten to just under thirty minutes; (iii) $12.50 if the player plays anywhere from thirty to just under forty-five minutes; (iv) $20 if the player plays anywhere from forty-five minutes to just under fifty minutes; and (v) $25 for any amount of play of fifty minutes or more.

The same scheme shown above may apply to the time at which the player began play. For example, a player may receive $0 if he begins play later than ten minutes to the hour, $6.25 if he begins play later than thirty minutes to the hour, $12.50 if he begins play later than forty-five minutes to the hour, $20 if he begins play later than fifty minutes to the hour, and $25 if he begins play fifty or more minutes to the hour. FIG. 9 illustrates a table showing the percentage of a payment a player will receive in the following hour based on when he begins play in the current hour. For example, if the player begins play from "0-10" minutes past the hour, then he receives 100% of the payment paid on the hour.

The amount of a payment the player receives may also be based on total number of pulls made, total amount wagered, etc. FIG. 6 shows an even more complicated payment scheme, in which the amount of a payment paid to a player is based both on the number of handle pulls a player has made, and the average amount of the player's wager per handle pull. It will be appreciated that the amount of a payment might be a function of any combination of criteria. The player may not even know the criteria.

Note that in an aforementioned example, a player received nothing for beginning play less than ten minutes to the hour. Thus, a player who began play at 12:55 would receive no portion of the payment scheduled to be paid at 1:00. Therefore, in some embodiments, a player who begins play at a time near to the payment of a scheduled payment, might have such play counted towards the next payment. Such an embodiment is depicted as the last entry in the table of FIG. 5. A player beginning play at 12:55 would have all his handle pulls count towards a payment that is to be paid at 2:00. Therefore, if the player were required to make four hundred handle pulls to receive the 2:00 payment, he could proceed at a more leisurely pace than could a player who was beginning play at 1:09.

At times, a player might wish to leave gaming device 104 prior to the time at which he is to receive a payment. Perhaps the player has some commitment, or perhaps the player has exceeded his gambling budget and wishes to stop gambling. It is therefore desirable, in many embodiments, to allow a player to receive a portion of a scheduled payment amount prior to the time at which the payment was to be made. For example, a player has been playing from 7:14 to 7:50, working towards an 8:00 payment. However, at 7:50 the player realizes he must catch a bus that leaves at 7:56. In some embodiments, the player may be able to receive at least a portion of the payment that would have been paid at 8:00, even though he is leaving at 7:50.

To begin with, a player who wishes to leave early, but still receive a portion of the guaranteed payment, may inform the gaming device 104 of his intention to leave and of his desire for some payment. The player may inform the gaming device by pressing a "Surrender" button, an "I want the bonus now" button, or some other such button (not shown). The player may also orally communicate his desire to leave, e.g., via a microphone, or may communicate his intention to the gaming device in any other manner. In some embodiments, the player may take actions indicative of his quitting the gaming device, at which point the gaming device might ask him whether or not he would like a portion of the guaranteed payment. For example, the player might press "Cash Out", may withdraw his tracking card from the tracking card reader 422, may cease making handle pulls, may stand up, etc. The gaming device may thereby infer that the player is leaving, and display a text or provide an audio message asking the player whether he would like to receive a portion of his payment.

If a player asks to receive a portion of his payment prior to the regularly scheduled time of payment, or if the gaming device 104 asks the player whether or not he would like to receive his payment, the gaming device may also inform the player of such information as how much he will receive, how much of the full payment he is giving up by leaving early, how much longer he need stay to receive the full payment, how many more pulls he need make to receive the full payment, and so on. A player who elects to receive a portion of his payment early, and is informed by the gaming device that he need only play for five more minutes to receive the full amount of the payment, may decide not to quit after all, and to wait until he receives the payment at the regularly scheduled time.

Just as with a player who began play late into a period prior to the payment of a payment, a player who quits early may receive an amount of the payment that is proportional to the amount of his play. For example, a player who quits after making four hundred out of six hundred required pulls, may receive only $20 of a scheduled $30 payment. Also, as with a player who began late, the portion of a payment a player receives may also be tiered based on whether the player's play with respect to a quantitative criterion (or criteria) has surpassed certain designated thresholds. For example, suppose a player begins play at 7:15, aiming for an 8:00 payment of four hundred credits. The player may receive: (i) four hundred credits if he plays until 8:00; (ii) three hundred credits if he plays past 7:50 but quits before 8:00; (iii) two hundred credits if he plays past 7:40 but quits before 7:50; (iv) one hundred credits if he plays past 7:30, but quits before 7:40; and (v) zero credits if he quits before 7:30.

A player may also receive a portion of a payment which is proportional to his amount of play, less a fixed penalty for quitting early. For example, if a player has satisfied 80% of a criterion for achieving a payment at the time that he quits, he may receive 80% of the payment minus a fixed penalty of five credits. In one or more embodiments, the penalty for quitting early is may not be fixed, but may be dependent upon how early the player quits. Therefore, a player who has made the full four hundred pulls out of a required four hundred pulls for a $30 payment, may receive only $25 if he quits five minutes early, only $20 if he quits ten minutes early, and only $15 if he quits more than fifteen minutes early. Of course, many other schemes for paying a portion of a payment to a player who has quit early are possible.

In one or more embodiments, a player's play may be saved and counted towards a future payment. For example, a player who has played for half an hour, but must quit early, may save the half hour of play and use it towards a future payment. The gaming device 104 may record the amount of time played by the player. When the player later returns to the gaming device, the player may identify himself and receive the benefit of his prior play. In an embodiment involving the casino server, the casino server may store an amount of play. When the player later visits another gaming device, the new gaming device may access the player's record in the casino server, and credit the player's saved time towards the next payment.

In one or more embodiments, a player who has not met the criteria for a payment, may have all or part of his play from the period prior to the time of the payment he did not receive, carried over to the next period, to count towards the next scheduled payment. For example, suppose, a player has made $300 in total wagers in the hour prior to the time of a payment that required $350 in total wagers. The player does not receive the payment. However, the player may remain at the gaming device, and may have his $300 in wagers counted towards the next scheduled payment. In this example, the player may need make only $50 in additional wagers in order to receive the next scheduled payment.

Step 1170: Provide the Payment Amount to the Player.

If the player has met the criteria for receiving a payment, or a partial payment, the gaming device 104 may provide the payment to the player at the scheduled time. For example, the gaming device may provide the player with the payment of $50 at 2:00. Scheduled times for payments may be, for example, every hour on the hour, every half hour, every fifteen minutes, once every two hours, every day at noon, every day at midnight, etc. Payments may be paid in cash or casino credits. In one or more embodiments, the payment may be made directly in coins. In such embodiments, the coins paid may drop directly into a player's coin tray when the payment is paid. Payments may also take the form of many other benefits to be provided to a player, including: (i) gambling tokens; (ii) reward points; (iii) free or discounted rooms; (iv) free or discounted show tickets; (v) free or discounted meals; (vi) free or discounted merchandise from a casino's shops or affiliated merchants; (vii) having balances or winnings rounded to a higher level (e.g., $85 rounded to $100); (viii) increased odds of attaining particular outcomes, increased pay for particular outcomes, extra winning outcomes, free spins, extra pay lines, and increased credit lines; (ix) the ability to play dollar machines for a quarter; (x) insurance against losses; (xi) priority on the use of particular gaming devices; and (xii) priority on getting tables at casino restaurants, priority on getting tickets to shows, and priority on sitting down at table games. Payments may also take the form of recognition. A player may be recognized by having his name and/or image displayed publicly. For example a player's name may be displayed on a board overlooking a bank of slot machines, or on the screens of multiple other slot machines.

At the time during which a gaming device is paying a payment, the gaming device may also create a sensory display. The gaming device may broadcast the sound of music, bells, chimes, buzzing, thunder, laughter, cheers, applause, general cacophony, or any other sound. In some embodiments, the gaming device may generate a synthesized sound of coins dropping, even as actual coins may be dropping. The gaming device may broadcast prerecorded or computer synthesized speech, including praise for the player receiving the payment. The gaming device may also turn on lights, flash lights, create colorful and/or varying graphical displays, and so on. The gaming device may spray water, confetti, or scented fragrance. The gaming device may create vibrations by, for example, broadcasting low frequency sound waves. In short, the gaming device may do anything to attract attention, to bring recognition upon the player receiving the payment, to generate good feeling, etc.

One advantage of having a gaming device pay a scheduled payment at a "round" time (e.g., 3:00 rather than 3:07), is that it is easy to have multiple gaming devices pay guaranteed payments according to a common schedule, without there being any linkages amongst the gaming devices. Each gaming device may maintain its own internal clock, and when the time of day reaches 3:00, the processor of each gaming device may consult its internal clock and determine that it is time to provide the payment. If each of multiple gaming devices has a fairly accurate internal clock, then all gaming devices will pay the guaranteed payment at the same time. When multiple gaming devices provide payments according to a common schedule, say every hour, then the gaming devices are said to be in synchrony. Gaming devices with separate internal clocks may be kept in synchrony through a periodic adjustment of internal clocks for any accumulated errors. For example, once a week, a casino employee may check the internal clocks of one or more gaming devices to make sure they are still accurate. If one or more of the clocks are not accurate, then the casino representative may adjust such clocks until they are accurate, or may replace such clocks with more accurate clocks. Alternatively, the internal clocks may be periodically updated via an electronic connection to a casino server (e.g., the casino server 102 of FIG. 2), or via a wireless signal from the casino server. Note that, in many embodiments, gaming devices need not contain internal clocks. Rather, in embodiments involving a casino server, gaming devices may receive time signals from the casino server via network connections. Gaming devices may also receive signals to simply pay payments. The casino server may signal multiple gaming devices to pay simultaneously, creating synchrony among the gaming devices. Also note that payments need not always be scheduled for "round" times. Each of multiple gaming devices could just as well pay payments at 3:07, 4:39, etc.

When multiple gaming devices are in synchrony, the providing of payments may become a large scale and spectacular event. When multiple gaming devices across a casino create sensory displays all at the same time, it may appear to a player as if the whole casino is erupting in light, sound, vibration, and/or aromas. All players in the casino may find the experience exciting and or stimulating. A person, upon hearing the commotion, may walk over to one of the gaming devices paying out a guaranteed payment. Once there, he may discover that each of the gaming devices participating in the sensory display pays out a guaranteed payment. Thus, the person may find himself newly introduced to the concept of a guaranteed payment, and realize that he too might partake in the commotion and he too might receive a guaranteed payment. Thus, the person might decide to try out one of the machines. Therefore, the simultaneous payment of guaranteed payments may serve as an effective advertising mechanism for all gaming devices that pay guaranteed payments. Furthermore, the simultaneous payment of guaranteed payments, and the inherent commotion, may serve as an effective advertising mechanism for a casino. Although exciting events typically happen fairly frequently at a casino, very rarely do many exciting events happen at the same time. For example, five people at a casino might win a substantial jackpot throughout the day, but it would be exceedingly rare for five people at a casino to win a jackpot all at the same time. Thus, if enough guaranteed payment machines were installed in a single casino, the simultaneous payment of payments, and the accompanying sensory displays, would create a level of excitement in a casino of unrivaled proportions. The effect of the simultaneous payment of payments, when compared to the effect of the payment of a single payment, would be analogous to the effect of multiple cuckoo clocks going off simultaneously in a clock store, when compared to the chiming of a single clock.

It may often be the case, that when it is the scheduled time of day for the payment of a guaranteed payment, a gaming device that pays a guaranteed payment will not have a resident player. Or in some cases, a player will be at the gaming device, but will not have met the criteria for receiving a payment. Even so, such gaming devices may create a sensory display at the time when payments are scheduled to be paid, without actually providing the payments. In this way, gaming devices that are not paying may still advertise themselves and thereby attract players who wish to receive the next scheduled guaranteed payment. Furthermore, gaming devices that are not currently providing payments may still add to the excitement and the commotion created by all gaming devices that pay guaranteed payments, generating more overall excitement in the casino, and conferring more excitement upon the players who are at gaming devices that are providing guaranteed payments. If a player is at a gaming device that provides a guaranteed payment, but has not met the criteria for earning the payment, then there is a possibility that the player will be disappointed when his gaming device begins flashing, broadcasting sounds, etc., and yet does not pay him a guaranteed payment. Such a gaming device may therefore print a text message, or otherwise communicate to the player, that he has not yet earned the guaranteed payment, but if he continues play, he will surely receive one during the next scheduled time of the guaranteed payment.

In one or more embodiments, it may be desirable to add to the general commotion of providing payments by providing the payments in coins. The sound of the payment coins dropping into players' trays across the casino may add to the general commotion. Furthermore, the sound of coins dropping is often pleasing to players of gaming devices, since it is often an indication of a win. To ensure that adequate coins are stored within a gaming device, a gaming device that is low on coins, but not necessarily out of coins, at a time prior to the provision of a guaranteed payment, may signal to a casino representative to bring coins to the gaming device, and to fill the hopper of the gaming device with coins. The gaming device may, for example, employ a sensor that detects the number or approximate number of coins remaining in its hopper. The processor of the gaming device may poll the sensor at a predetermined time prior to the scheduled time of a guaranteed payment, in order to determine whether to summon a casino representative. If, at the time when a guaranteed payment is scheduled to be paid, a gaming device does not have enough coins to pay the full guaranteed payment, then the gaming device may pay part of the payment in coins, and the rest of the payment in credits or in the form of some other benefit. However, the gaming device may synthesize the sound of coins dropping, even if there are no actual coins dropping.

In one or more embodiments, a gaming device might pay a number of smaller guaranteed payments leading up to the providing of a larger payment. For example, a gaming device may pay a $5 payment at fifteen minutes past the hour, a $10 payment at thirty minutes past the hour, another $5 payment at fifteen minutes until the next hour, and then a larger $30 payment on the hour. Of course, many other sizes of payments are possible. One advantage of paying smaller payments leading up to the payment of a larger payment is that the smaller payments may encourage a player to continue play so as to receive the larger payment. There may be individual criteria for receiving each of the payments that is paid. For example, to receive a $5 payment at fifteen minutes past the hour, a player might be required to have made one hundred handle pulls in the first fifteen minutes of the hour. In some embodiments, a player receives the larger payment only if he has also received all the smaller payments scheduled to be paid in the period prior to the payment of the larger payment.

Although the desirability of synchronizing the payment of guaranteed payments is described herein, one or more embodiments may allow gaming devices to pay guaranteed payments according to varying schedules. For example, seventeen out of twenty gaming devices that pay guaranteed payments in a casino may pay such payments every hour on the hour. However, the eighteenth such gaming device may pay a guaranteed payment only every thirty minutes past the hour, or only every nineteen minutes past the hour. When one or more gaming devices are not synchronized with the others, a player need not conform his schedule to the schedule of the majority of the gaming devices that pay guaranteed payments. For example, a player who begins play at 12:30, and can only play for an hour, may still have time to earn a guaranteed payment by playing at a gaming device that pays at half past the hour. The same player might not be able to earn a payment at a gaming device that pays only on the hour.

In one or more embodiments, gaming devices may not pay guaranteed payments according to a fixed schedule. Instead, a gaming device may provide a guaranteed payment based upon such factors as when the player has begun play, or when the player has met the criteria for receiving the guaranteed payment. For example, if a player begins play at a gaming device at 12:42, then the gaming device may pay its next guaranteed payment at 1:42. Or a gaming device may pay its guaranteed payment as soon as a player completes his four hundredth pull, makes his one thousandth wager, etc., no matter when such time occurs.

In one or more embodiments, a gaming device that is not synchronized with other gaming devices paying guaranteed payments may attempt to re-synchronize itself. For example, suppose a player begins play at a gaming device at 2:40. The criteria for receiving the guaranteed payment are typically one hour of play. However, the gaming device may schedule its next guaranteed payment at 3:50, rather than at 3:40, and then the following guaranteed payment at 5:00, rather than at 4:50. In this way, the gaming device has extended the criterion for receiving the guaranteed payment to one hour ten minutes from an hour. However, as a result, the third scheduled payment of a guaranteed payment will be on the hour. From then on, the gaming device may pay the guaranteed payment every hour, and may thereby maintain synchrony with other gaming devices. In a similar fashion, if a player begins play at a gaming device at 7:20, the next guaranteed payment may be paid at 8:10, and then the following may be at 9:00, after which subsequent guaranteed payments may be paid on the hour. Note that if a gaming device has extended the required time of play for a player from one hour, to one hour and ten minutes, the gaming device may concurrently relax another requirement, e.g., the required speed of play. Similarly, if a gaming device has reduced the required time of play, the gaming device may tighten another requirement, such as the speed of play.

In one or more embodiments, the gaming device 104 may delay the payment of a guaranteed payment past its scheduled time of payment so as to await the passing of an event. For instance, the gaming device may delay the payment of a scheduled payment until after the reels of the machine have stopped spinning, or until any payment for a winning outcome has been completed. By delaying the payment of the guaranteed payment, the gaming device may ensure that the player does not confuse the guaranteed payment with a payout for a winning outcome. If the player were to believe that the guaranteed payment were the result of an outcome on the gaming device, then the guaranteed payment might lose some of its attraction, its attraction being that it will be paid regardless of what outcomes are achieved by the player, and no matter how badly the player is otherwise faring. In one or more embodiments the gaming device may even prevent the player from taking any actions for a predetermined period of time prior to the providing of the guaranteed payment. For example, the gaming device might disable the “Bet 1” button, the “Spin” button, or any other buttons on the gaming device for 10 seconds prior to the payment of the guaranteed payment. In this way, the player may be less likely to believe that the guaranteed payment was paid as a result of the outcomes generated by the gaming device. In particular, if a guaranteed payment is scheduled to be provided at time T, then the gaming device may prevent any player action beginning after time T-t. If the player has initiated a handle pull prior to T-t, then the outcome may be allowed to resolve. However, the player may not be able to take any action once the outcome has resolved, and prior to the payment of the guaranteed payment. In one or more embodiments, a gaming device may not restrict player actions near to the time of the scheduled payment of a guaranteed payment. Instead, the gaming device may attempt to work around the player’s actions by paying the guaranteed payment as near to the scheduled time as possible, without providing the payment during a particular event. For example, suppose the gaming device has tracked the player’s play, and determined that the player initiates a handle pull approximately ever six seconds. If a player’s last outcome has resolved at 12:59:58, then the gaming device has a choice of paying the guaranteed payment immediately, i.e., at 12:59:58, or waiting for six seconds for the player to complete his next outcome, and paying the guaranteed payment at 1:00:04. In this case, the gaming device may decide to pay the guaranteed payment at 12:59:58, since it is closer to 1:00:00 than is 1:00:04.

In one or more embodiments, a player may win a jackpot or other large payout at a time soon before the scheduled payment of the guaranteed payment. Often, a jackpot is not paid immediately, since, in the first place, a gaming device typically does not store enough coins to pay a jackpot, and, secondly, the player may have to fill out tax forms before receiving the jackpot. Therefore, a player who has won a jackpot will often remain at his gaming device, without making further handle pulls, and wait for casino personnel to approach with his payment and tax forms. It may not be desirable to pay the guaranteed payment to such a player at its scheduled time for payment. A player who has won a jackpot often does not want anything to happen to his machine until he has received compensation for his jackpot outcome. He especially does not want the reels to move, or the display screen to change, because those are what show that he has won the jackpot. The payment of a guaranteed payment might frighten a player into thinking his jackpot outcome had been erased or forgotten. Therefore, in some embodiments, a gaming device may not pay a guaranteed payment at its scheduled time, if the player is awaiting payment of a jackpot or other high-paying outcome. However, once the player has been paid for his jackpot, and, for example, casino personnel have indicated to the gaming device that the jackpot has been paid to the player, then the gaming device may provide the payment that it had held off on providing. In one or more embodiments, casino personnel may simply pay the guaranteed payment to the player when providing him with his jackpot.

In one or more embodiments, at any given scheduled time for the providing of a guaranteed payment, only a single payment is paid from amongst a designated group of gaming devices. For example, suppose there are ten adjacent gaming devices at a casino, each designated as paying a guaranteed payment. However, at the end of each hour, only one of the ten machines pays the guaranteed payment. In this case, the providing of the payment is no longer absolutely guaranteed to every player at one of the ten gaming devices. However, the payment is still guaranteed in the sense that at least one player on the group of machines will receive the payment, provided he meets certain criteria (e.g., makes a minimum number of handle pulls in the prior hour).

The designated gaming devices may be connected to a server, such as the casino server 102 of FIG. 2. The server may be responsible for determining which of the designated gaming devices is to provide the payment, and may signal, to the chosen gaming device, authorization to pay the guaranteed payment, as well as the amount of the payment to be paid. Alternatively, one of the designated gaming devices may serve as the server, and may determine which of the gaming devices is to provide the guaranteed payment, and may provide the signal to do so. The server may also control the display of the size of the payment. For example, the server may receive signals from each of the designated gaming devices indicating the amount of play at each of them. Then, for example, when the amount of play exceeds a predetermined threshold, the server may signal the display panel to increment the size of the displayed payment amount.

The size of the single payment paid by one of a plurality of machines may be based on the total amount of play by players at all of the plurality of machines. For example, if ten different players at a group of ten machines make a total of five thousand handle pulls between 12:00 and 1:00, then the payment paid at 1:00 may be $250. However, if the players at the group of ten machines make ten thousand handle pulls between 12:00 and 1:00, then the payment paid at 1:00 may be $500. So the payment may be proportional to the total amount of play at the group of designated machines, may be tiered based on the total amount of play crossing certain thresholds, or may be otherwise functionally dependent upon the amount of play. In addition to the number of handle pulls, the payment may be based on the amounts wagered at the group of designated gaming devices, on the number of pay lines played, on the amount of time played, on the number of different machines that were in use, on the wager sizes, on the particular games that were played at each of the machines, on the length of breaks taken, and on any other criteria discussed previously. The size of the payment to be paid may be displayed to each of the players on any one of the designated gaming devices, via a text display on the screen of the gaming devices, or via any other means. Alternatively, or additionally, the size of the payment to be paid may be displayed on a display panel overlooking the group of designated gaming devices. As play at the designated gaming devices proceeds, the size of the payment to be paid may increase, and such increases may be displayed as they occur. For example, every time the players at the designated gaming devices complete, as a group, one hundred handle pulls, the size of the payment may increment by $1.

At the time when the payment is scheduled to be paid, one of the gaming devices from the designated group of gaming devices may be selected to provide the payment. In some embodiments, the gaming device at which the payment will be provided is selected at random, with each of the designated gaming devices having an approximately equal probability of selection. The server may, for example, employ a random number generator to determine a random number, divide the random number by the number of designated gaming devices, and use the remainder from such operation to determine which gaming device should pay the guaranteed payment.

In another embodiment, the gaming device to pay the guaranteed payment is selected based on the amount of play that occurred at the gaming device in the period of time prior to the scheduled payment of the guaranteed payment. Thus, if a first gaming device generated two hundred outcomes, and a second gaming device generated four hundred outcomes, then the second gaming device would be twice as likely to be selected as the first gaming device.

In one or more embodiments, the gaming device to pay the guaranteed payment is selected based on the amount of play at the gaming device by the current occupant of the gaming device. Therefore, if a first gaming device has generated four hundred outcomes in the last hour, all for its current occupant, and a second gaming device has also generated four hundred outcomes in the last hour, but only two hundred of which were for its current occupant, then the first gaming device might be twice as likely to be selected for the payment of the payment as the second gaming device. Additionally, in many embodiments, a gaming device with no current occupant may have no chance of being selected.

In one or more embodiments, the gaming device to pay the guaranteed payment is selected based in part on the amount of skill exhibited at the gaming device in the period prior to the payment of the guaranteed payment. Multiple casino games require skill, among them video poker, and various trivia games. The server may monitor play at each of the gaming devices, compare the play to known rules of strategy, and determine the level of skill exhibited at each of the gaming devices. The server may then bias the choice of a gaming device towards those gaming devices where more skill was demonstrated.

In one or more embodiments, a player at a gaming device that is selected may receive an amount of the guaranteed payment that is dependent upon his amount of play in the time period prior to the scheduled payment of the payment. For example, if the player has played for the full hour prior to the providing of the payment (which is paid every hour, in this example), then the player may receive the full amount of the payment. However, if the player has played only half an hour, then the player may receive only half of the amount of the payment. In this way, a player is rewarded for his amount of play at one of the designated gaming devices for the period prior to the providing of the payment. Otherwise, players might simply sit down at gaming devices that pay guaranteed payments just prior to the scheduled payment of the payment. If a player does not receive the full amount of a guaranteed payment, then the remaining amount of the payment may be paid by another of the designated gaming devices, which may once again be selected at random. Alternatively, the remaining amount of the payment may be added to the guaranteed payment to be paid at the next scheduled time of payment.

It is to be understood that there are many other possible variations to the embodiment where a single gaming device, selected from amongst a plurality of designated gaming devices, pays a guaranteed payment at periodic intervals. For example, in a group of designated gaming devices, two devices may be chosen to pay a guaranteed payment, rather than just one. Additionally, the choice of whether one, two, or more gaming devices will each pay the guaranteed payment may depend on the total amount of play at the designated gaming devices in the period of time prior to the scheduled payment of the guaranteed payment.

Reference is now made to the flowchart 1200 illustrated in FIG. 12. Flowchart 1200 illustrates one or more embodiments in which guaranteed payments made by a plurality of gaming devices 104, 106, 108, (112, 114) may be synchronized with one another. Process 1200 may be performed, for example, by casino server 102, by a gaming device that is in communication with one or more gaming devices, by a casino employee, or by any other suitable entity. At Step 1210, a gaming device that will provide a guaranteed payment may be determined. At Step 1220, second such device may be determined. As will be appreciated, any number of gaming devices may be identified for providing a guaranteed payment. Gaming devices that are determined at Steps 1210 and 1220 may or may not have commonalities. For instance, the gaming devices may be of the same type, the gaming devices may be made by the same manufacturer, the gaming devices may feature similar games, the gaming devices may have similar capabilities (e.g., both may have audio speakers of a particular quality), and so on. In one or more embodiments where multiple gaming devices are from the same manufacturer, the manufacturer may take the role of the "third-party server" 110 in FIG. 1B. The third-party server 110 may identify one or more gaming devices through communication with the casino server 102, or through communication with other gaming devices (e.g., gaming devices 112 and 114). The third-party server 110 may even contribute funds for the providing guaranteed payments. Of course, a third-party 110 server may perform any practicable embodiments within the scope of process 1200, or of any other process described herein.

In the performance of Steps 1210 and 1220, and in the performance of other steps of process 1200, a data structure such as the gaming device database 210 of FIG. 7 may be utilized. Database 210 stores exemplary data about a number of gaming devices. A casino server may, for example, determine one or more gaming devices by identifying gaming devices from database 210 possessing certain characteristics. For example, casino server 102 may identify all gaming devices located in "Bank #3", or may identify all gaming devices that play the game "Lucky Days are Here Again".

Gaming devices determined at Steps 1210 and 1220 may, in one or more embodiments, be located in proximity to one another. When proximate gaming devices are later instructed to provide synchronized payments, the cumulative sound effects may create a memorable sensory experience for casino patrons, as described herein.

In one or more embodiments, gaming devices determined at Steps 1210 and 1220 may be separated from one another. One or more gaming devices, e.g., which do not provide guaranteed payments, may be disposed between gaming devices determined in Steps 1210 and 1220. In one or more embodiments where gaming devices are separated from one another, but provide guaranteed payments simultaneously, a randomly chosen casino patron may be more likely to be close to a gaming device that is making a guaranteed payment at a scheduled time. Thus, a relatively larger group of casino patrons may be exposed to the concept of gaming devices that provide guaranteed payments. One consequence of an embodiment in which a relatively small number of gaming devices providing guaranteed payments are spread throughout a casino, is that one or more gaming devices that do not provide guaranteed payments may lie between one or more gaming devices that do.

At Step 1230, a reference time may be determined. The reference time may be, for example, the time at which the gaming devices selected in Steps 1210 and 1220 may provide guaranteed payments. The reference time may be determined by retrieving a reference time for each respective gaming device of the gaming devices selected at steps 1210 and 1220 from field 725 of gaming device database 210. However, the reference time may be determined in some other fashion, in which case such a time may only then be populated into field 725 of the appropriate records in gaming device database 210.

At Step 1240, the first gaming device (e.g., the gaming device determined at Step 1210) may be instructed to provide a guaranteed payment at the reference time. At Step 1250, the second gaming device (e.g., the gaming device determined at Step 1220) may also be instructed to provide a payment at the reference time. The times at which the first gaming device and the second gaming device provide a guaranteed payment may thereby be synchronized. It should be noted that a considerable amount of time may elapse between times when one or more gaming devices are instructed of the reference time at which to provide a guaranteed payment, and the reference time itself. For example, at 8:10, a gaming device may be instructed to provide a guaranteed payment at 8:35. The gaming device may then wait for thirty-five minutes after receiving instructions before actually providing a guaranteed payment.

F. Example Illustrative Embodiment of the Invention

Example one of an embodiment: John was wandering the aisles of a casino looking for a slot machine to play. As he walked by, he glanced at the screen of a nearby slot machine. In large text, the screen said "This machine pays a $50 bonus in fifty-five minutes. Begin play now to receive the bonus, guaranteed!" John thought to himself, "I'm here for a couple of hours anyway, why not take a free $50?" So John sat down at the machine and began play. As he played he noticed a display in the upper right hand corner of his slot machine's display screen. The display said "Time until $50 bonus: 54:59." As he played, the clock counted down. John also noticed three light-emitting diodes (LED's) on a panel beneath the screen of his slot machine. One LED was red, one yellow, and one green. The green LED was lit at the moment.

After about twenty minutes of play, John had lost a little bit of money. Then John's friend Bill walked by. John stopped playing and began chatting with Bill about how each was faring. After a few minutes of chatting, John heard a beeping sound from his slot machine. He looked back and saw some pre-composed text that was newly backlit on his slot machine. The text was right beneath the three LED's. The text read, "Keep up your rate of play to receive the bonus—keep the light in the green." John noticed that now the yellow LED was lit, and the green one was off. So John asked Bill to sit down next to him, and John began playing once again while still chatting with Bill. After a few minutes of play, John saw that the green LED was once again lit, and that the pre-composed text was no longer lit.

When the clock in the upper right hand corner of his display screen read 00:15, John was down $30. However, he was happy because he would soon receive the $50 bonus. He also noticed that his machine would no longer accept wagers, nor let him spin. A message appeared saying, "Please wait, guaranteed bonus in X seconds." When the clock hit zero, his slot machine seemed to fly into action. His screen began flashing myriad different colors. In the center of his screen was maintained the text, "$50 BONUS!!!" The LED's, and many other lights around his slot machine that he hadn't even noticed, began flashing. He heard the sound of trumpets, and drums. But it was not just his machine. All around the casino, other machines put on similar displays. The lights and the trumpets and the drums were everywhere. Even machines in front of which no players were standing were making sounds. All around the casino, players looked up from their slot machines to see what was happening. Then the coins started pouring out. Fifty one-dollar tokens poured into John's tray. At the same time, coins were pouring into 100 other slot machines, all with players standing in front of them. The sound of coins dropping came from all directions.

John was happy to have the $50. He was also happy to be a part of a casino-wide spectacle. Bill was so impressed that he walked around looking for another machine like John's.

G. Additional Embodiments of the Invention

One of the criteria for receiving a guaranteed payment may be whether the player performs an act external to his interaction with the gaming device. Qualifying acts may include: eating at the casino's restaurant, attending a show, registering as a guest of the casino's hotel, gaming at other gaming devices. Qualifying acts may also include: switching phone services, signing up for a credit card, test driving an automobile, listening to a life-insurance quote, listening to a time-share pitch, etc. Additionally, qualifying acts may include commitments to act, including: commitments to perform any of the aforementioned acts in the future, commitments to visit the casino in the future, commitments to wager a certain amount in the future, and so on.

In one or more embodiment, a player may answer survey questions in order to qualify or remain qualified to receive a guaranteed payment. For example, a player begins playing at 3:10 so as to receive a guaranteed payment at 4:00. However, the player runs out of money at 3:45. The player may still receive the payment, however, if the player remains at the gaming device and answers survey questions. Survey questions may ask the player about his experience at the casino, his experience at the casino hotel, at casino restaurants, etc. Answers to the survey questions may help the casino improve the way it treats customers. Survey questions may also ask about potential designs for a new detergent box, or about potential designs for the exterior of a new car. Answers may help third-party merchants to design more attractive or better products, and third-party merchants may pay the casino for administering the survey questions. Survey questions may also ask the player about his own status as a homeowner, car owner, life insurance policy holder, smoker, etc. Such question may allow the casino or third-party merchants to target marketing offers to the player. The player may be required to answer the survey questions at a minimum rate. For example, the player must answer at least 4 questions per minute to remain qualified to receive the guaranteed payment. Alternatively, the player might need to answer a fixed number of questions, corresponding to the amount of time by which the player fell short, the number of pulls by which the player fell short, or the amount of any other criterion by which the player fell short. If the player has answered a sufficient number of survey questions by the scheduled time of the guaranteed payment, then the player may receive the guaranteed payment.

In one or more embodiments, a limited number of gaming devices that pay guaranteed payments may be distributed about the area of a casino in such a way as to maximize the advertising or attracting features of their synchronized provision of the payments. For example, gaming devices may all be placed adjacent to one another, so that, when they simultaneously create sensory displays, the effect of a single machine is compounded by the presence of multiple such machines in close proximity. In one or more embodiments, gaming devices are distributed at regular spacing intervals, about the floor of a casino. For example, gaming devices are spaced so that no two gaming devices paying guaranteed payments are within a predetermined distance of one another. In this way, every person in the casino is more likely to be proximate to at least one of the gaming devices, and may therefore notice one of them when it creates a sensory display.

In one or more embodiments, a player must pay an upfront fee at the start of a playing session in order to be eligible to receive the guaranteed payment. The fee may or may not be fully refunded if the player remains to receive the guaranteed payment.

In one or more embodiments, a player who has not met the criteria for receiving a guaranteed payment, may still receive payment of the payment provided he agrees to completely fulfill the criteria of the payment after the payment has been paid. To ensure that a player complies, the gaming device may withhold a portion of a player's credit balance until the player has fulfilled the criteria to receive the payment.

In one or more embodiments, a warning to a player that he is not on track to receive a payment may take the form of an audio message from his gaming device. The audio message may further inform the player of what he needs to do to avoid losing the payment. For example, the audio message might warn the player to play more rapidly.

Another method by which the gaming device may warn a player to play more rapidly in order to receive the payment, is by switching the whole background color of the device, e.g., from green to red.

In one or more embodiments, additional taxes may be levied upon players who are not on track to receive a guaranteed payment. The additional taxes may make up for the statistical shortfall in funding, and allow the player to still receive the payment.

In one or more embodiments, if a player's gaming device jams, malfunctions, requires a hopper fill, or cannot be used for any other reason, the time during which the gaming device is out of service may still count towards the fulfillment of player criteria. For example, if a player must play for fifty minutes to receive a payment, and if he actually plays for thirty minutes, but waits twenty minutes for a hopper fill, then the player may still be eligible to receive the guaranteed payment. However, if the malfunction was due to deliberate activities of the player, the lost time may not count towards fulfillment of the criteria. For example, if the player has inserted large bills and cashed out with the express intention of emptying the coin hopper, then the time the player spends waiting for the hopper fill may not count. To prevent a player from deliberately emptying a hopper, a gaming device may restrict the number of times, or the amounts for which a player may cash out. If the player cashes out for too much, or cashes out too often, he may no longer be eligible for the guaranteed payment.

In one or more embodiments, a player may receive an extra payment when the guaranteed payment is paid, provided his play has met certain criteria. Exemplary criteria may be that, in the period prior to the payment of the payment, the player's winnings have exceeded a certain threshold, or that the player's losses have exceeded a certain threshold (e.g., the player has lost more than $100), or that the player won on a predefined number of consecutive pulls just prior to the payment of the payment. The extra payment may result in the player receiving a multiple of the normal payment amount (e.g., twice the normal amount) or the normal payment amount plus a fixed amount of money (e.g., the normal amount plus $100).

In one or more embodiments, players at table games may receive guaranteed payments. A dealer, pit boss, or other casino employee may monitor such things as when a player begins play, the number of hands in which the player participates, and the average size of the player's wager. Then, at a scheduled time, a casino employee may pay qualifying players by providing them with cash, chips, or other consideration.

In one or more embodiments, a player at a video arcade may receive a guaranteed payment for playing for a designated period of time. The payment may consist of a number of free games, extra points, extra lives, prizes, recognition, or cash. If the payment is cash, then an employee of the arcade may bring the cash to the player.

In the one or more embodiments where a guaranteed payment is paid to one of a group of gaming devices, the gaming device that receives the payment may be the gaming device that generates the best (e.g., highest paying) outcome. For example, just prior to the scheduled payment of a guaranteed payment, players at each gaming device in the group are given the opportunity to make one last handle pull. The player with the highest-paying outcome then wins the guaranteed payment for that group of machines. In one instance, the gaming device at which the guaranteed payment is paid is the one that first achieves a particular outcome. For example, the first gaming device in a bank of ten gaming devices to achieve bar-bar-bar is the one that will pay the guaranteed payment. However, the race to achieve bar-bar-bar begins only two minutes prior to the payment of the payment. If no gaming device achieves bar-bar-bar, then the guaranteed payment may not be paid, and may roll over to the next period. In another instance, a guaranteed payment is paid, not to the first gaming device to achieve a particular outcome, but to the first player at a table game to achieve a particular outcome. For example, the first player at a table game to achieve a blackjack within a designated two-minute period at the end of the hour may receive a guaranteed payment.

Although the payment of scheduled payments has been described as guaranteed, scheduled payments may, in some embodiments, be conditioned upon some measure of luck. For example, a gaming device may pay scheduled payments to a player if his net winnings for a period of time prior to the payment of the guaranteed payment fall within a predetermined range. Another criterion would require the player's gross winnings to fall within a predetermined range. Clearly, a player does not have full control over his net winnings. If he did, casinos would likely go bankrupt. However, the range within which a player's net or gross winnings fall might be made large enough so that a player would be able to receive the payment with a high degree of confidence. For example, suppose a gaming device has a 95% payback percentage. Thus, for every dollar a player wagers, he can expect to receive $0.95 in payouts. Suppose now that the player must have gross winnings of more than $200 for an hour in order to receive the guaranteed payment. If the player wagers a total of $500, say over the course of five hundred handle pulls, then the player can expect to receive gross winnings of 95%×$500, or $475. Therefore, by putting in a sufficient amount of money, it is very likely that the player will achieve gross winnings in excess of $200, and receive the scheduled payment. It is conceivable that the player could make five hundred handle pulls of $1 each, and lose on every single handle pull. However, such an event would be extremely unlikely on most gaming devices. Although it is more likely the player would not gross in excess of $200, such an event would still be very unlikely. Thus, a payment, even though somewhat dependent on luck, may be "almost guaranteed" in the sense that a player who desired to receive such a payment would be able to do so with a high degree of confidence.

Reference is now made to the flowchart 1300 illustrated in FIG. 13. Flowchart 1300 illustrates one or more embodiments where, after a required amount of play, and/or at a scheduled time, a player may receive a guaranteed entry into a bonus round. For example, once a player has been playing at a gaming device for fifteen minutes, the player may automatically reach the bonus round. One common feature of bonus rounds is that they often allow a player to win large payouts. Therefore, a guaranteed entry into a bonus round may be seen as equally or more desirable than a guaranteed payment.

As the steps of flowchart 1300 draw parallels with the steps of flowchart 11, described extensively here, flowchart 1300 will be described only briefly. At Step 1310, a gaming device 104 may advertise guaranteed entry into a bonus round. For example, gaming device may print a message on display screen 400 indicating that a player at the gaming device may receive "Guaranteed Entry into a Bonus Round Every Hour on the Hour!" At Step 1320, the player may insert currency into gaming device 104, the may initiate handle pulls, and the gaming device may generate outcomes for the player. At Step 1330, the gaming device 104 may tax the play of the player. As in the one or more embodiments described herein with respect to a payment, a player may be required to play for a certain minimum amount of time, to play at a certain rate, to wager a minimum cumulative amount, or to meet other criteria before being eligible for automatic entry into a bonus round. At Step 1340, the gaming device may therefore inform the player of his progress towards gaining entry into the bonus round. If the player is in danger of not meeting one or more of the criteria (e.g., he has been playing too slowly and risks not making enough handle pulls in the remainder of a designated time period to be eligible for the entry), then the gaming device may provide a warning. The warning may indicate that the player risks ineligibility for automatic entry into a bonus round, and may also indicate steps the player might take to improve his chances of becoming eligible. At Step 1350, the gaming device may receive a confirmation of the player's presence. The player may confirm his presence, for example, though the insertion of a player tracking card, through entry of a code known only to the player, through a biometric indicator, or through some other means. By confirming the presence of a first player who has played for a significant period of time prior to the time of guaranteed entry into a bonus round, the gaming device may ensure that a second player does not take advantage of the activity of the first player by sitting down at the gaming device just prior to the time of the bonus round. At Step 1360, e.g., if the player's presence has been confirmed from step 1350, then the gaming device may, at a prescheduled time, provide the player with automatic entry into a bonus round.

In one or more embodiments, automatic entry into a bonus round is conditioned upon the player's not having reached the bonus round earlier within a designated period. For example, after fifteen minutes of play, a player may automatically reach the bonus round only if he had not already done so during the fifteen minutes of play. In such embodiments, automatic entry into a bonus round after a certain period of time may ensure that a player does not play for an extended period of time without reaching a bonus round. Players who do play for an extended time without reaching a bonus round may become frustrated and may leave a gaming device. Therefore, various embodiments of the present invention serve to avoid player frustration.

If a player does reach a bonus round for any reason, e.g., due to an outcome on the reels, then an internal clock of the gaming device may be reset to zero. The player may then have to play for another fifteen minutes (or other designated time period) before being provided with automatic entry into the bonus round. In some embodiments, automatic entry into a bonus round may only be available at scheduled times, such as on the hour, at fifteen minutes past, at thirty minutes past, and at forty-five minutes past. A player who has been playing for the entire preceding period of fifteen minutes without reaching the bonus round may then be eligible to be entered automatically into a bonus round. However, for example, if a player begins play at seven minutes past the hour and does not reach the bonus round by fifteen past, the player may not be eligible for automatic entry into the bonus round because he had not played for the entire fifteen-minute period. The player may later be eligible for automatic entry into the bonus round at thirty minutes past the hour if he continues to play and is not entered into the bonus round via some other mechanism.

In one or more embodiments, a player may be guaranteed a certain number of entries into a bonus round per period of time. For example, the player may be guaranteed four entries per hour. In one exemplary embodiment, a player who has not reached a bonus round at all during sixty minutes of play may automatically be entered into the bonus round on four successive occasions. In one or more embodiments, if the player has not been entered into the bonus round according to a predefined schedule, the player may be given a single automatic entry. For example, if a player has not been entered into a bonus round after fifteen minutes, then the player may receive an automatic entry. Similarly, if a player has not twice played in a bonus round after thirty minutes of play, then the player may receive another automatic entry. One difference between the present embodiment and another embodiment discussed above, is that in the present embodiment, a player might achieve multiple entries into a bonus round within a short time of beginning play. The player would then be ineligible for automatic entry into a bonus round for the remainder of the hour, even if he later went for more than fifteen minutes without obtaining entry into a bonus round.

Note that, as with other embodiments of this invention, one or more taxes may be withheld from the player in order for the casino to be able to provide automatic entry into bonus rounds and to still maintain profitability.

In one or more embodiments, all automatic entries into a bonus round may occur at the same time in various different gaming devices throughout the casino. That is, where eligible, players at multiple different gaming devices would be entered into the bonus round at the same time. Further, the outcome of the bonus round may be synchronized among all the gaming devices. In other words, all bonus rounds may result in the same sequence of events and in the same payouts for all players involved. The sensory effect of the bonus round may thereby be compounded as like sound effects simultaneously emanate from multiple gaming devices.

H. Conclusion

It is clear from the foregoing discussion that the disclosed systems and methods to facilitate rate of play optimization represents an improvement in the art of electronic commerce and gaming. While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense.

Further, even though only certain embodiments have been described in detail, those having ordinary skill in the art will certainly appreciate and understand that many modifications, changes, and enhancements are possible without departing from the teachings thereof. All such modifications are intended to be encompassed within the following claims.

What is claimed is:

1. A method of operating a gaming system, said method comprising:

(a) at a first point in time, determining, via a processor of a device operable to facilitate a wagering game:

(i) a current time, and (ii) a reference time, wherein at the first point in time, the reference time is different than the current time, the determined reference time is independent of any randomly generated outcome for any play of the wagering game and the device is at least one of a gaming device, a server operatively connected to the gaming device, and a handheld portable device; and (b) at a second, subsequent point in time, when the then current time has a predetermined relationship to the determined reference time:

(i) determining whether a player has satisfied at least one criterion, said determination being independent of any randomly generated outcome for any play of the wagering game; and (ii) if the determination is that the player has satisfied the at least one criterion, providing a payment having a value greater than zero, wherein the payment is guaranteed to be provided upon the then current time having the predetermined relationship to the determined reference time and the determination to provide the payment is not dependent on any randomly generated outcome for any play of the wagering game.

2. The method of claim 1, wherein determining a reference time includes determining a beginning of a next hour.

3. The method of claim 1, wherein determining a reference time includes determining a time that is a predetermined number of minutes before a beginning of a next hour.

4. The method of claim 1, wherein determining whether a player has satisfied at least one criterion includes determining whether the player has made a specified number of handle pulls at the gaming device.

5. The method of claim 1, wherein determining whether a player has satisfied at least one criterion includes determining whether the player has made a specified number of handle pulls at the gaming device within a time interval beginning a specified period of time prior to the determined reference time, and ending with the determined reference time.

6. The method of claim 5, wherein determining whether a player has satisfied at least one criterion includes determining whether the player has made a specified number of handle pulls at the gaming device within a time interval beginning one hour prior to the determined reference time, and ending with the determined reference time.

7. The method of claim 1, wherein determining whether a player has satisfied at least one criterion includes determining whether the player has wagered, at the gaming device, an amount of currency whose aggregate value is at least a specified value, within a time interval beginning a specified period of time prior to the determined reference time, and ending with the determined reference time.

8. The method of claim 1, wherein determining whether a player has satisfied at least one criterion includes determining whether the player has paid, in taxes to the gaming device, an amount of currency whose aggregate value is at least a specified value, within a time interval beginning a specified period of time prior to the determined reference time, and ending with the determined reference time.

9. The method of claim 1, wherein determining whether a player has satisfied at least one criterion includes determining whether the player has maintained a specified average rate of play at the gaming device within a time interval beginning a specified period of time prior to the determined reference time, and ending with the determined reference time.

10. The method of claim 1, further comprising: producing a sound via the gaming device if the then current time has the predetermined relationship to the determined reference time.

11. The method of claim 1, further comprising: producing via the gaming device, if the then current time has the predetermined relationship to the determined reference time, a sound of coins dropping, without dropping a coin.

12. The method of claim 1, further comprising:

generating an outcome;

determining a payout associated with the outcome; and apportioning the payout into a first payment and a second payment.

13. The method of claim 12, further comprising: providing the first payment.

14. The method of claim 12, in which providing comprises: providing, if the then current time has the predetermined relationship to the determined reference time, the second payment.

15. The method of claim 12, wherein apportioning includes apportioning, based on a predetermined percentage, the payout amount into a first payment and a second payment.

16. A gaming system comprising:

a processor;

an input device;

a display device; and a memory which stores a program including a plurality of instructions, which when executed by the processor, cause the processor to operate with the display device and the input device to:

(a) at a first point in time, determine:

(i) a current time, and (ii) a reference time, wherein at the first point in time, the reference time is different than the current time and the determined reference time is independent of any randomly generated outcome for any play of any wagering game; and (b) at a second, subsequent point in time, when the then current time has a predetermined relationship to the determined reference time:

(i) determine whether a player has satisfied at least one criterion, said determination being independent of any randomly generated outcome for any play of the wagering game; and (ii) if the determination is that the player has satisfied the at least one criterion, provide a payment having a value greater than zero, wherein the payment is guaranteed to be provided upon the then current time having the predetermined relationship to the determined reference time, and the determination to provide the payment is not dependent on any randomly generated outcome for any play of any wagering game.

17. The gaming system of claim 16, wherein when executed by the processor, the plurality of instructions cause the processor to: determine a beginning of a next hour.

18. The gaming system of claim 16, wherein when executed by the processor, the plurality of instructions cause the processor to: determine a time that is a predetermined number of minutes before a beginning of a next hour.

19. The gaming system of claim 16, wherein when executed by the processor, the plurality of instructions cause the processor to: determine a size of the payment deterministically.

20. The gaming system of claim 16, wherein when executed by the processor, the plurality of instructions cause the processor to: determine whether the player has made a specified number of handle pulls at a gaming device.

21. The gaming system of claim 16, wherein when executed by the processor, the plurality of instructions cause the processor to: determine whether the player has made a specified number of handle pulls at a gaming device within a time interval beginning a specified period of time prior to the determined reference time, and ending with the determined reference time.

22. The gaming system of claim 21, wherein when executed by the processor, the plurality of instructions cause the processor to: determine whether the player has made a specified number of handle pulls at a gaming device within a time interval beginning one hour prior to the determined reference time, and ending with the determined reference time.

23. The gaming system of claim 16, wherein when executed by the processor, the plurality of instructions cause the processor to: determine whether the player has wagered, at a gaming device, an amount of currency whose aggregate value is at least a specified value, within a time interval beginning a specified period of time prior to the determined reference time, and ending with the determined reference time.

24. The gaming system of claim 16, wherein when executed by the processor, the plurality of instructions cause the processor to: determine whether the player has paid, in taxes to a gaming device, an amount of currency whose aggregate value is at least a specified value, within a time interval beginning a specified period of time prior to the determined reference time, and ending with the determined reference time.

25. The gaming system of claim 16, wherein when executed by the processor, the plurality of instructions cause the processor to: determine whether the player has maintained a specified average rate of play at a gaming device within a time interval beginning a specified period of time prior to the determined reference time, and ending with the determined reference time.

26. The gaming system of claim 16, in which when executed by the processor, the plurality of instructions cause the processor to: produce a sound via the gaming device if the then current time has the predetermined relationship to the determined reference time.

27. The gaming system of claim 16, in which when executed by the processor, the plurality of instructions cause the processor to: produce via the gaming device, if the then current time has the predetermined relationship to the determined reference time, a sound of coins dropping, without dropping a coin.

28. The gaming system of claim 16, in which when executed by the processor, the plurality of instructions cause the processor to:

generate an outcome;

determine a payout associated with the outcome; and apportion the payout into a first payment and a second payment.

29. The gaming system of claim 28, in which when executed by the processor, the plurality of instructions cause the processor to: provide the first payment.

30. The gaming system of claim 28, in which when executed by the processor, the plurality of instructions cause the processor to: providing, if the then current time has the predetermined relationship to the determined reference time, the second payment.

31. The gaming system of claim 28, in which when executed by the processor, the plurality of instructions cause the processor to: apportion, based on a predetermined percentage, the payout amount into a first payment and a second payment.

32. A method of operating a gaming system, said method comprising:

determining, via a processor of a device operable to facilitate a wagering game, a reference time that is a predetermined number of minutes before or after a beginning of a next hour and is independent of any randomly generated outcome for any play of the wagering game, wherein the device comprises at least one of a gaming device, a server operatively connected to the gaming device, and a handheld portable computing device;

determining, via the processor, a current time;

determining, via the processor, whether a player of the gaming device has satisfied at least one criterion, said at least one criterion at least including that the player has paid, in taxes to the gaming device, an amount of currency whose aggregate value is at least a specified value, within a time interval beginning a specified period of time prior to the reference time, and ending with the reference time, and said determination being independent of any randomly generated outcome for any play of the wagering game;

determining a value of a payment independently of any prior outcomes randomly generated by the gaming device, said value being greater than zero; and if the player of the gaming device has satisfied the at least one criterion and is present at the gaming device when the current time has a predetermined relationship to the determined reference time, providing, the determined payment, said determination to provide said payment not depending on any randomly generated outcome for any play of the wagering game and being guaranteed upon the current time having the predetermined relationship to the reference time if the player satisfied the at least one criterion.

* * * * *

UNITED STATES PATENT AND TRADEMARK OFFICE
CERTIFICATE OF CORRECTION

PATENT NO. : 8,113,946 B2
APPLICATION NO. : 10/419303
DATED : February 14, 2012
INVENTOR(S) : Jay S. Walker et al.

It is certified that error appears in the above-identified patent and that said Letters Patent is hereby corrected as shown below:

IN THE CLAIMS:

In Claim 2, Column 53, Line 51, replace “a” with --the--.

In Claim 3, Column 53, Line 53, replace “a” with --the--.

In Claim 4, Column 53, line 56, replace “a” with --the--.

In Claim 4, Column 53, Line 57, between “satisfied” and “at” insert --the--.

In Claim 5, Column 53, Line 60, replace “a” with --the--.

In Claim 5, Column 53, Line 61, between “satisfied” and “at” insert --the--.

In Claim 6, Column 53, Line 66, replace “a” with --the--.

In Claim 6, Column 53, Line 67, between “satisfied” and “at” insert --the--.

In Claim 6, Column 54, Line 1, replace “a” with --the--.

In Claim 7, Column 54, Line 5, replace “a” with --the--.

In Claim 7, Column 54, Line 6, between “satisfied” and “at” insert --the--.

In Claim 8, Column 54, Line 12, replace “a” with --the--.

In Claim 8, Column 54, Line 13, between “satisfied” and “at” insert --the--.

In Claim 9, Column 54, Line 19, replace “a” with --the--.

In Claim 9, Column 54, Line 20, between “satisfied” and “at” insert --the--.

IN THE CLAIMS:

Signed and Sealed this
Nineteenth Day of February, 2013

Teresa Stanek Rea
*Acting Director of the United States Patent and Trademark Office*

In Claim 14, Column 54, Line 39, replace “in which providing comprises” with --further comprising--.

In Claim 15, Column 54, Line 45, replace both instances of “a” with --the--.

In Claim 16, Column 54, Line 67, replace “the” with --any--.

In Claim 22, Column 55, Line 35, replace “a” with --the--.

In Claim 22, Column 55, Line 36, replace the first instance of “a” with --the--.

In Claim 26, Column 56, Line 1, replace the second instance of “the” with --a--.

In Claim 27, Column 56, Line 6, replace the second instance of “the” with --a--.

In Claim 30, Column 56, Line 22, replace “providing” with --provide--.

In Claim 31, Column 56, Line 28, replace both instances of “a” with --the--.

In Claim 32, Column 56, Line 57, delete the “,” after “providing.”.